US011392589B2

(12) United States Patent
Glover et al.

(10) Patent No.: US 11,392,589 B2
(45) Date of Patent: Jul. 19, 2022

(54) MULTI-VERTICAL ENTITY-BASED SEARCH SYSTEM

(71) Applicant: Branch Metrics, Inc., Redwood City, CA (US)

(72) Inventors: Eric Glover, Palo Alto, CA (US); Jonas Bauer, Atherton, CA (US); Rishi Khaitan, San Francisco, CA (US); Matthew Dale, Seattle, WA (US); Dmitri Gaskin, San Carlos, CA (US); Charles Gilliam, Seattle, WA (US); Pavan Achanta, Union City, CA (US); Zachary Joel Rivest, Seattle, WA (US); Nicholas Chen, Lake Forest Park, WA (US)

(73) Assignee: Branch Metrics, Inc., Palo Alto, CA (US)

( * ) Notice: Subject to any disclaimer, the term of this patent is extended or adjusted under 35 U.S.C. 154(b) by 0 days.

(21) Appl. No.: 16/900,534

(22) Filed: Jun. 12, 2020

(65) Prior Publication Data
US 2020/0394194 A1 Dec. 17, 2020

Related U.S. Application Data

(60) Provisional application No. 62/865,554, filed on Jun. 24, 2019, provisional application No. 62/861,091, filed on Jun. 13, 2019.

(51) Int. Cl.
*G06F 16/24* (2019.01)
*G06F 16/2455* (2019.01)
(Continued)

(52) U.S. Cl.
CPC ...... *G06F 16/24553* (2019.01); *G06F 16/221* (2019.01); *G06F 16/248* (2019.01)

(58) Field of Classification Search
CPC . G06F 16/24553; G06F 16/221; G06F 16/248
(Continued)

(56) References Cited

U.S. PATENT DOCUMENTS 7,769,767 B2 8/2010 Petersen
9,619,574 B2 4/2017 Shapira et al.
(Continued)

OTHER PUBLICATIONS

Advertising ID—Developer Console Help, Internet Archive—Wayback Machine, https://web.archive.org/web/20161217180225/https://support.google.com/googleplay/android-developer/answer/6048248?hl=en, dated Dec. 17, 2016, accessed on Aug. 6, 2018, 2 pages.
(Continued)

*Primary Examiner* — Syling Yen
(74) *Attorney, Agent, or Firm* — RMCK Law Group PLC

(57) ABSTRACT

A method includes generating vertical-specific (VS) records from data sources. Each VS record includes a vertical identifier and a set of VS data fields. The method further comprises generating, for each VS record, an entity partial (EP) record that includes EP data fields populated from the VS data fields. The EP data fields include an entity ID that indicates an entity for the EP record, a source data field that identifies a data source, and an EP searchable data field including data that is descriptive of the entity. The method further comprises generating a search record for each entity ID by combining data from EP records. The data from the EP records is combined based on the source data included in the EP records. Each search record includes a search record searchable data field that includes data from one or more of the EP searchable data fields.

20 Claims, 15 Drawing Sheets

(51) Int. Cl.
*G06F 16/22* (2019.01)
*G06F 16/248* (2019.01)

(58) Field of Classification Search
USPC ........................................................ 707/736
See application file for complete search history.

(56) References Cited

U.S. PATENT DOCUMENTS

| | | |
|---|---|---|
| 9,721,021 B2 | 8/2017 | Klotz |
| 10,067,752 B1 | 9/2018 | Dukes et al. |
| 10,091,312 B1 | 10/2018 | Khanwalkar et al. |
| 10,423,691 B1 | 9/2019 | Patel et al. |
| 2013/0124309 A1 | 5/2013 | Traasdahl et al. |
| 2013/0275195 A1 | 10/2013 | Gabryelski et al. |
| 2014/0129733 A1 | 5/2014 | Klais |
| 2014/0214916 A1 | 7/2014 | Gokul |
| 2014/0250106 A1 | 9/2014 | Shapira et al. |
| 2014/0358887 A1 | 12/2014 | Morris et al. |
| 2015/0156061 A1 | 6/2015 | Saxena et al. |
| 2015/0242420 A1 | 8/2015 | Glover et al. |
| 2016/0055133 A1 | 2/2016 | Look et al. |
| 2016/0142858 A1 | 5/2016 | Molinet et al. |
| 2016/0147896 A1* | 5/2016 | Glover ............... G06F 16/9535 707/728 |
| 2016/0179882 A1* | 6/2016 | Glover .............. G06F 16/24524 707/756 |
| 2017/0017721 A1* | 1/2017 | Sauper .................. G06F 16/248 |
| 2017/0195990 A1* | 7/2017 | Ben-Tzur ................. H04W 4/06 |
| 2018/0025086 A1 | 1/2018 | Malkin et al. |

OTHER PUBLICATIONS

Apple IDFA: A Primer for Marketers, https://apsalar.com/2015/06/all-about-idfa/, dated Jun. 30, 2015, accessed on Aug. 6, 2018, 4 pages.

Friedenthal, A., "5 Lessons Learned in Site Retargeting," website archived on Dec. 23, 2017, https://web.archive.org/web/20171223134610/https://www.softwareadvice.com/resources/5-lessons-learned-site-retargeting/, accessed on Aug. 28, 2018, 4 pages.

HTTP cookie from Wikipedia, Internet Archive—Wayback Machine, https://web.archive.org/web/20161231030710/https://en.wikipedia.org/wiki/HTTP_cookie dated Dec. 31, 2016, accessed on Aug. 6, 2018, 18 pages.

PCT International Search Report and Written Opinion dated Jul. 26, 2018 for PCT International Application No. PCT/US2018/031375, 12 pages.

PCT International Search Report and Written Opinion dated Nov. 19, 2019 for International Application No. PCT/US2019/049888, 11 pages.

Wikipedia, "Behavioral retargeting," website archived on May 26, 2017, https://web.archive.org/web/20170526165029/https://en.wikipedia.org/wiki/Behavioral_retargeting, accessed on Aug. 28, 2018, 2 pages.

Wikipedia, "Dynamic Creative," website archived on Nov. 21, 2016, https://web.archive.org/web/20161121151105/https://en.wikipedia.org/wiki/Dynamic_creative, accessed on Aug. 28, 2018, 1 page.

Wikipedia, "Site retargeting," website archived on Mar. 27, 2017, https://web.archive.org/web/20170327080616/https://en.wikipedia.org/wiki/Site_retargeting, accessed on Aug. 28, 2018, 1 page.

* cited by examiner

MULTI-VERTICAL ENTITY-BASED SEARCH SYSTEM

CROSS-REFERENCE TO RELATED APPLICATIONS

This application claims the benefit of U.S. Provisional Application No. 62/861,091, filed on Jun. 13, 2019 and U.S. Provisional Application No. 62/865,554, filed on Jun. 24, 2019. The disclosures of each of the above applications are incorporated herein by reference in their entirety.

FIELD

The present disclosure relates to providing search results for applications.

BACKGROUND

Software developers develop a wide range of applications that are accessed by users on a variety of different platforms, such as different computing devices and operating systems. Example applications may include e-commerce applications, media streaming applications, business review applications, social media applications, and news applications. These applications can provide users with different functionalities for a variety of different entities and verticals. For example, applications in an e-commerce vertical may provide consumer product entities for sale. As another example, applications that provide media streaming functionality may provide access to digital media entities (e.g., movies/songs).

SUMMARY

In one example, a method comprises generating a plurality of vertical-specific (VS) records from a plurality of data sources. Each VS record is associated with one of N different verticals and includes a vertical identifier (ID) that indicates a vertical associated with the VS record, wherein the vertical refers to a type of application content associated with the VS record. Each VS record also includes a set of vertical-specific data fields for the vertical associated with the VS record. The method further comprises generating an entity partial (EP) record for each of the VS records. Each EP record includes a set of EP data fields populated based on data from one or more vertical-specific data fields. The set of EP data fields includes an entity ID that indicates an entity associated with the EP record, a source data field that identifies a data source for the VS record used to generate the EP record, and an EP searchable data field including data that is descriptive of the entity associated with the EP record. The method further comprises generating a search record for each entity ID by combining data from EP records associated with the same entity ID. The data from the EP records is combined based on the source data included in the EP records. Each search record includes a search record searchable data field that includes data from one or more of the EP searchable data fields of the EP records used to generate the search record. The method further comprises receiving a search query from a user device, identifying a set of search records based on matches between terms of the search query and terms in the search record searchable data of the set of search records, and sending search results to the user device that are based on the identified set of search records.

In one example, a system comprises one or more storage devices configured to store a plurality of vertical-specific (VS) records, entity partial (EP) records, and search records. The system further comprises one or more processing units that execute computer-readable instructions that cause the one or more processing units to generate the plurality of VS records from a plurality of data sources. Each VS record is associated with one of N different verticals and includes a vertical identifier (ID) that indicates a vertical associated with the VS record, wherein the vertical refers to a type of application content associated with the VS record. Each VS record also includes a set of vertical-specific data fields for the vertical associated with the VS record. The one or more processing units are configured to generate one EP record for each of the VS records. Each EP record includes a set of EP data fields populated based on data from one or more vertical-specific data fields. The set of EP data fields includes an entity ID that indicates an entity associated with the EP record, a source data field that identifies a data source for the VS record used to generate the EP record, and an EP searchable data field including data that is descriptive of the entity associated with the EP record. The one or more processing units are configured to generate one search record for each entity ID by combining data from EP records associated with the same entity ID. The data from the EP records is combined based on the source data included in the EP records. Each search record includes a search record searchable data field that includes data from one or more of the EP searchable data fields of the EP records used to generate the search record. The one or more processing units are configured to receive a search query from a user device, identify a set of search records based on matches between terms of the search query and terms in the search record searchable data of the set of search records, and send search results to the user device that are based on the identified set of search records.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
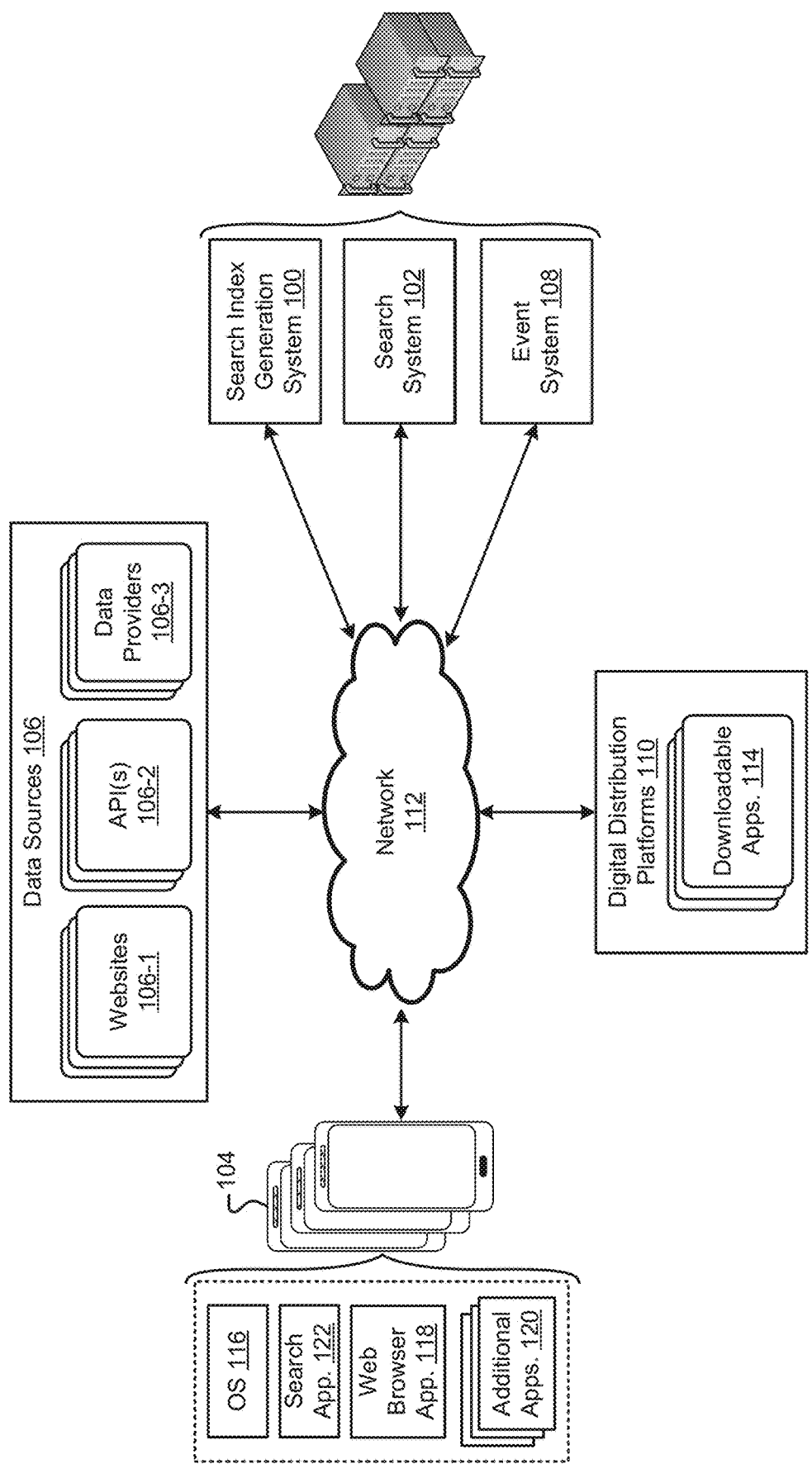
FIG. 1 illustrates an environment that includes an example search index generation system, search system, and event system of the present disclosure.

FIG. 1 illustrates an environment that includes a search index generation system 100 (hereinafter "index generation system 100") that generates a search index 200. A search system 102 may use the search index 200 to generate search results in response to search queries received from user devices 104. The index generation system 100 may acquire data (e.g., application data) from a variety of data sources 106, such as websites 106-1, applications, application programming interface (API) calls 106-2, and other data providers 106-3. In some implementations, the index generation system 100 may acquire data from an event system 108 that includes event data indicating how users engage with applications and websites.

The search system search index 200 may include an application search index that the search system 102 may use to provide search results for applications. For example, the search system 102 may provide search results that include user-selectable application links that a user may select (e.g., touch/click) on a user device 104. In some examples, a user-selectable application link may access an application state of an application installed on the user device. For example, a user-selectable application link may open an application page of an application installed on the user device.

Applications may be associated with one or more verticals. A vertical may refer to a term that is descriptive of the content associated with (e.g., provided by) the application. For example, a vertical may refer to a field or category of content that is provided by the application. Example verticals may include, but are not limited to, restaurants, music, hotels, travel, news, sports news, shopping, employment, and social. In one example, a music application that provides streaming music to a user may be associated with a "music" vertical. In another example, a hotel reservation application that provides the user with hotel reservation functionality may be associated with a "hotel" vertical.

In some implementations, an application may be associated with a single vertical. For example, an application may provide content for a single vertical. In a specific example, a restaurant review application may provide restaurant reviews and ratings for the "restaurant" vertical. In some implementations, an application may be associated with multiple verticals. For example, a general review application may provide reviews and ratings for multiple verticals, such as a "restaurant" vertical and a "hotel" vertical.

An application may provide content for a plurality of entities. Entities may refer to persons, places, or things, such as specific restaurants, movies, songs, cities, actors, etc. In one example, a restaurant review application may provide reviews and ratings for a specific restaurant entity. In another example, a movie streaming application may provide movie streaming functionality for movie entities. In some cases, a single application state (e.g., page) may provide content for a single entity. For example, an application state for a restaurant review application may include content for a single restaurant. In some cases, a single application state (e.g., page) may provide content for multiple entities. For example, a restaurant review application may provide reviews for multiple different restaurants in the same application state.

The index generation system 100 may generate the search index 200 based on a variety of data sources 106 that provide data for a plurality of applications. Example data sources 106 may include, but are not limited to, websites 106-1, APIs 106-2, data providers 106-3, and the event system 108. For example, a website 106-1 may include a plurality of webpages, each of which are associated with one or more entities. In some cases, websites may have corresponding applications that include similar data. For example, a website may have a webpage that includes the same/similar data for an entity as an application state. In a specific example, a business review website and the corresponding business review application may include websites and application pages for the same businesses. Accordingly, in some cases, the data extracted from a webpage may be used in a search index 200 that provides results for applications.

In some cases, an application developer may provide an API system 106-2 (e.g., server) that the index generation system 100 may use to acquire data for an application. For example, the index generation system 100, or other system, may acquire data for an application by making API calls to the API system 106-2. The API system 106-2 may respond to the call by providing data, such as data for a single application state and/or entity.

Other example data sources may include one or more data providers 106-3. The data providers 106-3 may represent computing systems that provide other data to the index generation system 100. The other data may include any data associated with applications, such as website data, application data, and event data. In some implementations, the data providers may be businesses that provide data management and analytics services (e.g., to the index generation system 100). The data providers may collect additional data regarding applications and how users are using the applications. Example data management providers may include mParticle Inc. of New York, N.Y., Segment Inc. of San Francisco, Calif., and Factual Inc., of Los Angeles, Calif.

The event system 108 may also provide data to the index generation system 100. For example, the event system 108 may provide data to the index generation system 100 that indicates how users interact with entities (e.g., application states and webpages). In one example, the event system 108 may provide one or more usage values that indicate how users interact with entities. In another example, the event system 108 may provide one or more popularity values (e.g., scores) for an entity that indicate the popularity of the entity relative to other entities. For example, a popularity score may indicate the number of times the application state for the entity was accessed relative to the number of times one or more other application states were accessed.

Figure 2:
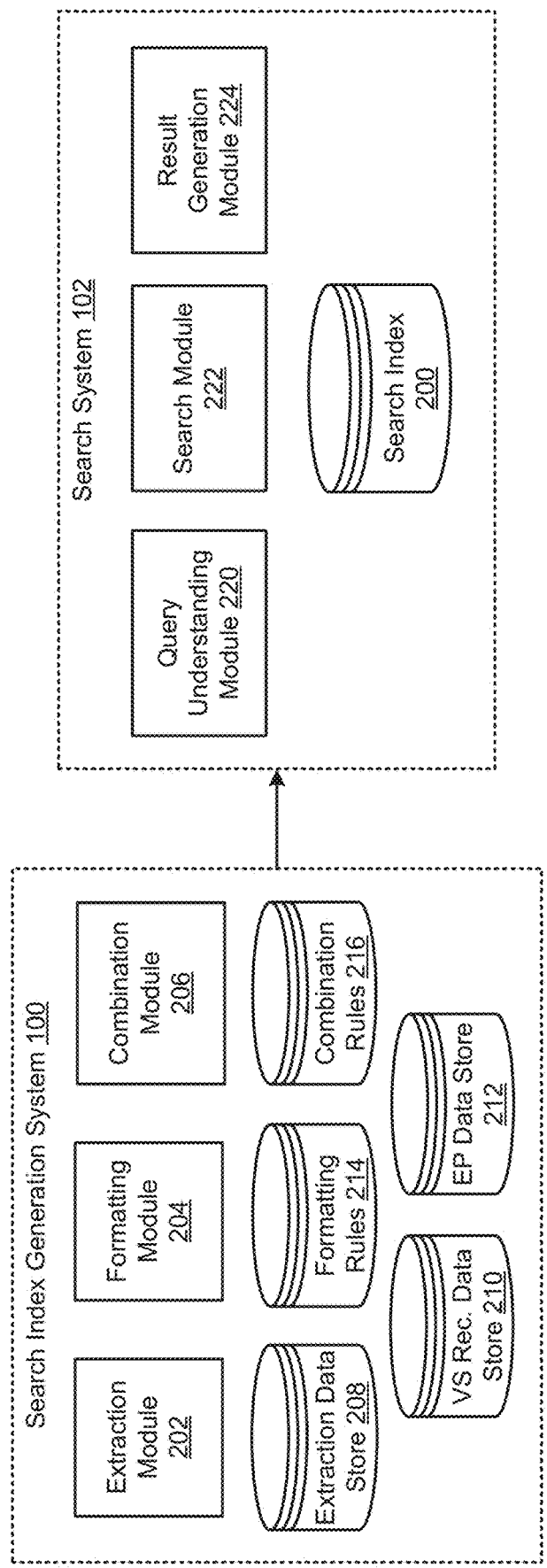
FIG. 2 is a functional block diagram of an example search index generation system and a search system.
Figure 3:
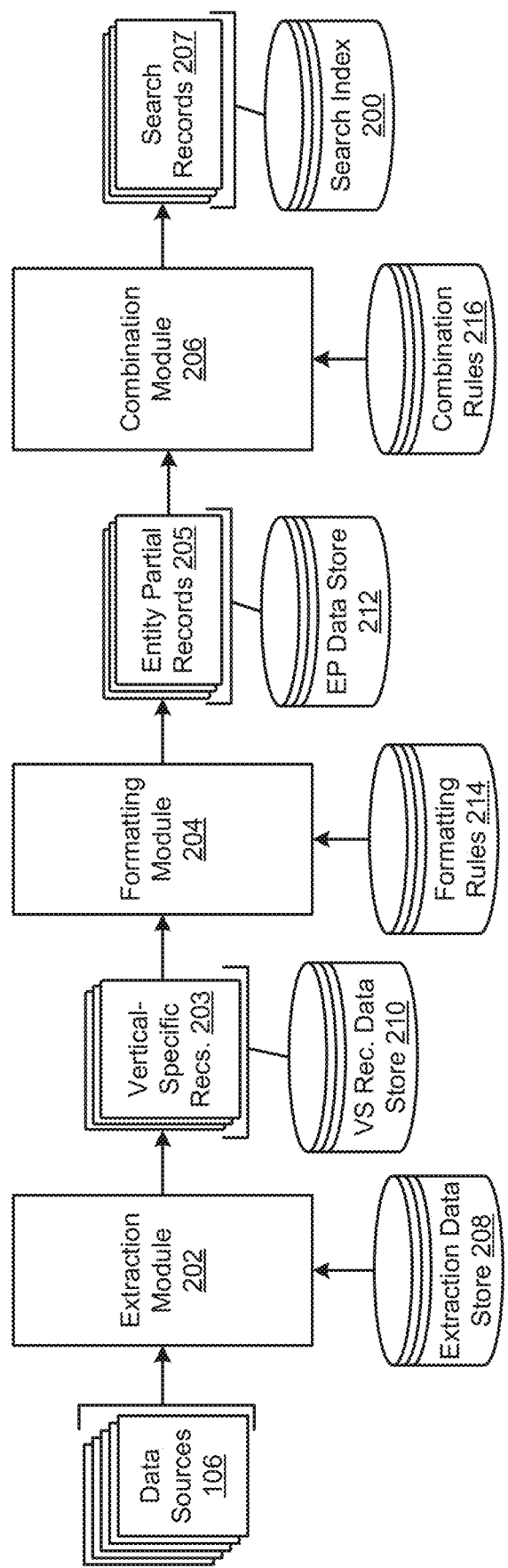
FIG. 3 is a functional block diagram of an example search index generation system.

FIGS. 2-3 illustrate an example index generation system 100. The index generation system 100 includes an extraction module 202, a formatting module 204, and a combination module 206. The extraction module 202 generates vertical-specific (VS) entity records 203 based on data extracted from the data sources 106. The extraction module 202 may generate VS records 203 according to extraction rules stored in the extraction data store 208. The VS records 203 may include data from a data source (e.g., a single data source) that is associated with a vertical (e.g., a single vertical). For example, a VS record 203 may include data extracted from a single webpage or API call. VS records for different verticals may include different sets of data fields that are specific to the verticals. The VS records 203 may be stored in the VS record data store 210.

The formatting module 204 generates entity-partial (EP) records 205 based on the VS records 203. The formatting module 204 may generate EP records 205 according to formatting rules 214. The EP records 205 may include an entity name/ID that identifies an entity associated with the EP record 205. The EP records 205 may also include searchable data, scoring/filtering data for ranking search results, display data for rendering a search result for the entity, and link data that may be used by the user device 104 to access the entity within the application. The EP records 205 may be stored in the EP data store 212.

Different data sources may provide different information for different entities and verticals. As such, different EP records may provide different information related to entities. For example, multiple EP records for the same entity may include different information for the entity. In a specific example, there may be two EP records from two different data sources, each of which provide different data for combination into a search record (e.g., see FIG. 7C). The EP records 205 may be referred to as entity-partial records because the content of the EP records 205 may be processed and/or combined with other EP records 205 to generate completed search records 207 for the search index 200. The completed search records may provide a more complete and up-to-date picture of the associated entity than the individual EP records for the entity.

The combination module 206 may combine data from EP records 205 to generate the search records 207 used by the search system 102. The combination module 206 may combine the EP records 205 according to combination rules 216 that may define how EP records/fields should be combined. The search records 207 may include the same/similar data fields as the EP records 205. For example, the search records 207 may include an entity name/ID, searchable data, scoring/filtering data, and display/link data (e.g., see FIG. 7C).

In some implementations, the EP records 205 may include fields that the combination module 206 may use to determine whether/how to combine data from EP records 205 into a search record 207. For example, the EP records 205 may include fields that indicate a source/date of extraction. The source data may indicate the source of the data, such as whether the source is a website, application, API, or third-party data source. The date/time data (hereinafter "date data") may include a date/time the data was extracted. Additionally, or alternatively, the date data may include a date/time of the content itself, such as a date extracted from the content (e.g., a news article date).

The combination module 206 may process and/or combine the fields based on the source/date of the extracted data. For example, the combination module 206 may prioritize data for a search record 207 based on the source and/or date of the data. The combination module 206 may also make decisions about which data to keep, drop, or combine based on the quality or contents of the data field or another field. In some examples, a value in one field may affect whether another field from a different source is used or not.

The search system 102 may store the search records 207 in the search index 200. The search system 102 receives search requests (e.g., search queries) from user devices 104, generates search results based on the search index 200, and sends the search results to the user devices 104. A user device 104 (e.g., search application) may generate a search results page based on display/link data included in the search results. The user may select a search result link to access an application state associated with the search result (e.g., the search result entity).

As described herein, the index generation system 100 may generate a multi-vertical application search index 200 that may be used by the search system 102 (e.g., for keyword content search). The index generation system 100 may efficiently optimize the normalization of structured/unstructured data from a variety of data sources 106 into the search index 200. The index generation system 100 may extract data in a way that reflects and captures the uniqueness of each application and/or vertical. Additionally, the index generation system 100 may extract data and generate search records 207 across a variety of data sources 106 that are constantly changing, thereby providing a search system 102 that may provide up-to-date search results for different applications.

Although the search index 200 may be used for search, the search index 200 may also be used by other systems for alternative/additional purposes, such as for generation of search suggestions, search auto-complete, and statistical analysis to generate new features, such as for language modeling and feature learning (e.g., word embedding). The index generation system 100, search system 102, and event system 108 may be operated by a single party in some implementations. In other implementations, the systems 100, 102, 108 may be operated by more than one party.

Referring to FIG. 1, the plurality of user devices 104, the search system 102 (e.g., a server computing device), the index generation system 100 (e.g., a server computing device), one or more digital distribution platforms 110, and the data sources 106 may be in communication with one another via a network 112. The network 112 may include various types of computer networks, such as a local area network (LAN), wide area network (WAN), and/or the Internet. User devices 104 may include, but are not limited to, handheld computing devices (e.g., smartphones and tablets), laptop computing devices, desktop computing devices, and wearable computing devices.

The environment of FIG. 1 includes one or more digital distribution platforms 110. The digital distribution platforms may represent computing systems that are configured to distribute applications 114 to user devices 104. Example digital distribution platforms include, but are not limited to, the GOOGLE PLAY® digital distribution platform by Google, Inc. and the APP STORE® digital distribution platform by Apple, Inc. The digital distribution platforms 110 may include one or more downloadable applications 114. Users may download the applications 114 from the digital distribution platforms 110 and install the applications on user devices 104.

A user device 104 includes an operating system 116 and a plurality of applications, such as a web browser application 118 and additional applications 120. Example additional applications 120 may include, but are not limited to, e-commerce applications, social media applications, business review applications, banking applications, gaming applications, and weather forecast applications. Using the web browser 118, the user device 104 can access various websites via the network 112. The user device 104 may also download applications 114 from the digital distribution platforms 110 via the network 112 and install the applications.

The user device 104 includes a search application 122. The search application 122 can communicate with the search system 102 to receive search results. For example, the search application 122 can receive a user's search query and make a search request to the search system 102. The search application 122 can receive and display search results received from the search system 102.

Search results received by the search application 122 can include display data for rendering the search results in a graphical user interface (GUI). The display data for a search result may include, but is not limited to: 1) the application name, 2) the title of the result (e.g., a restaurant name), 3) a description of the state associated with the result (e.g., a description of a restaurant and/or the star-rating of the restaurant), 4) one or more images associated with the application state, 5) user context-dependent data, such as distance from the entity to the user's current location, and 6) any other metadata, such as entity popularity (e.g., to assist the user in determining which results should be selected). The search results can also include link data for accessing the application states associated with the search results. An application state may generally refer to a page/screen of an application. In some cases, the search results can include application universal resource identifiers (URIs) (e.g., uniform resource locators) that launch the application states on the user device 104. In other cases, the search results can include application metadata that the application can use to access the application state.

The user can select one of the search results in the GUI. The user device 104 can open the application state associated with the search result using the data included in the received search result. The user may then interact with the accessed application state. In a specific example, with respect to the YELP® business directory application developed by Yelp, Inc., selecting a YELP® application search result for the Round Table Pizza restaurant may access the Round Table Pizza application state of the YELP® application (e.g., the Round Table Pizza state for their city).

The search application 122 may be implemented on the user device 104 in a variety of ways. In some implementations, the user may download the search application 122 (e.g., from a digital distribution platform 110) and install the search application 122 on the user device 104. In other implementations, the search application 122 may be installed on the user device 104 before the user purchases the user device (e.g., as a preloaded application). In some cases, the search application 122 may be referred to as a "native application" or a "widget." In some implementations, the functionality attributed to the search application 122 herein may be included in other applications, such as a launcher application or as part of a smart assistant device, such as a smart speaker device (e.g., an ECHO smart speaker by Amazon.com, Inc., a GOOGLE HOME smart speaker by Google, Inc., or an Apple HOMEPOD smart speaker by Apple, Inc.). In some implementations, the search application 122 can communicate with the search system 102 via another computing system (e.g., a partner of the search system 102). In some implementations, the functionality attributed to the search application 122 herein may be implemented as a web-based search accessed using the web browser 118 on the user device 104.

The user can enter a search query into the search application 122. The search application 122 generates a search request including the search query and other data. In some implementations, the search application 122 can acquire context data to include in the search request. Context data may include a variety of types of data, such as a user ID, operating system information, device type information, geolocation data, time of day, query history data (e.g., one or more prior queries in the search application), application usage data, user state of motion data (e.g., walking, biking, driving), user-historical context (e.g., all of the above historically), and/or category of the query (e.g., selected in the GUI).

The search application 122 may receive search results from the search system 102. The search application 122 may render the search results as user-selectable links that access content for entities in applications and websites. For example, the user-selectable links may access content (e.g., pages) for business entities, movie entities, music entities, and other types of entities. In some implementations, the search system/application may group search results together by the vertical (e.g., category) and/or the application associated with the search results. For example, the search system 102 may group the search results by business type (e.g., restaurant, hotel, etc.). Operation of an example search system 102 is described with respect to FIG. 8. Although the user-selectable links may access content, the user-selectable links may perform other functions. For example, the user-selectable links may launch applications that perform actions, such as opening the camera application, taking a picture using the camera application, turning on Bluetooth® functionality, etc.

Figure 4:
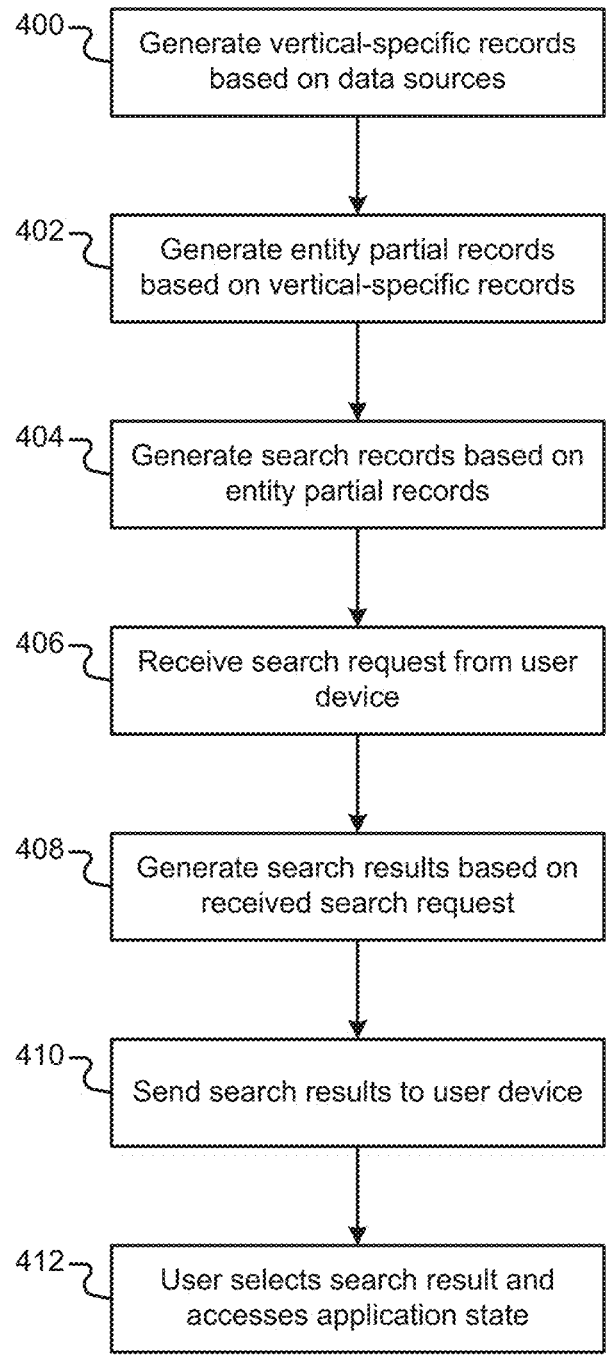
FIG. 4 is an example method for generating a search index and using the search index for application searching.
Figure 6A:
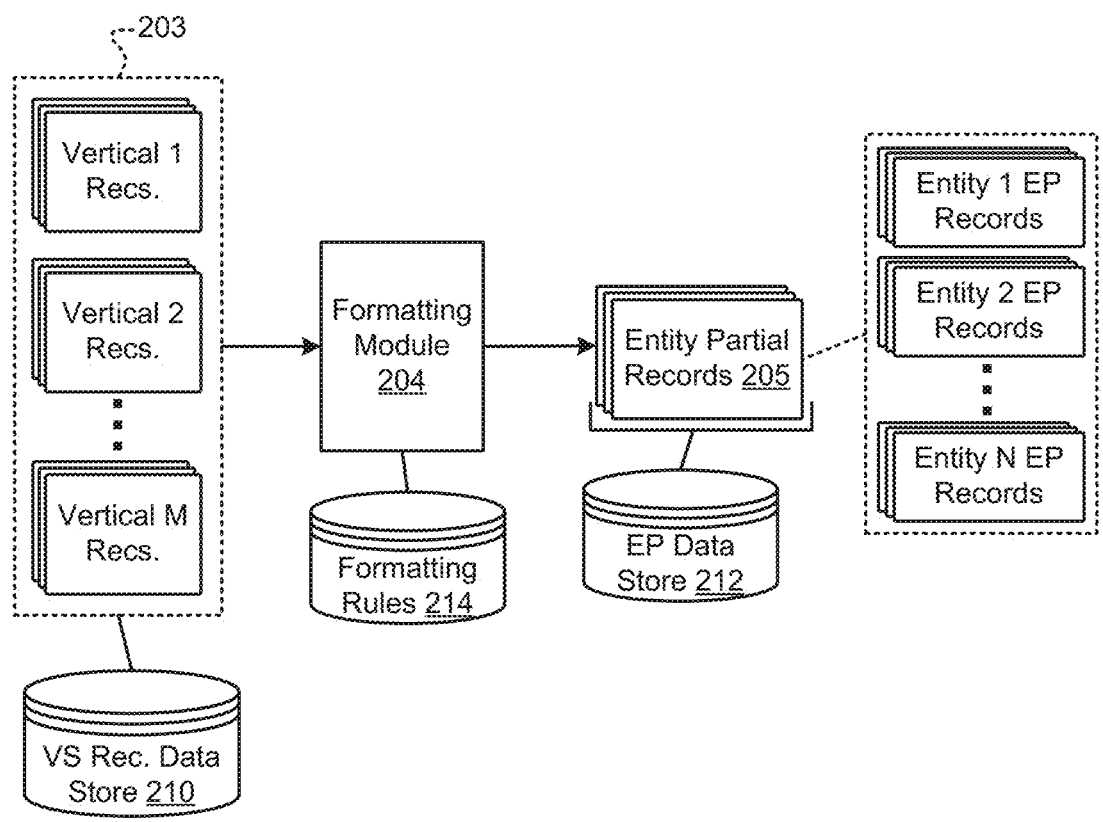
FIGS. 6A-6B are functional block diagrams of an example formatting module that generates entity partial records.
Figure 6B:
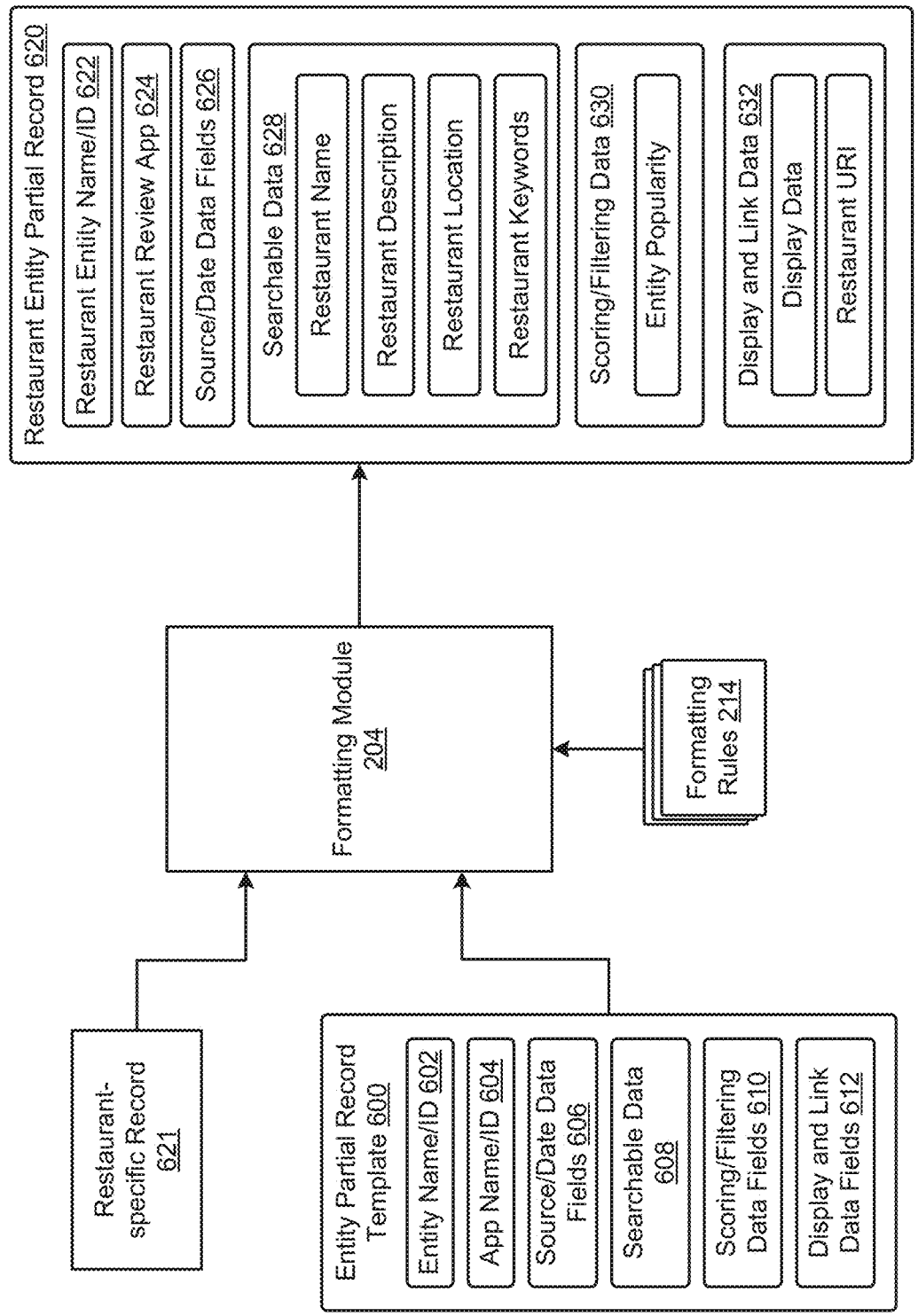
Figure 6C:
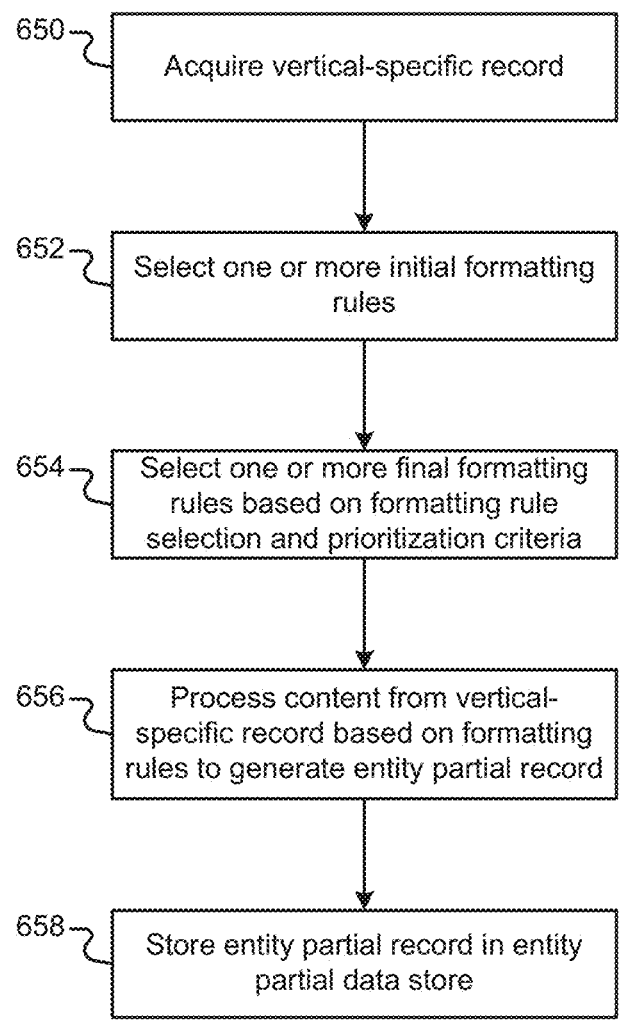
FIG. 6C is an example method for generating an entity partial record from a vertical-specific record.
Figure 7A:
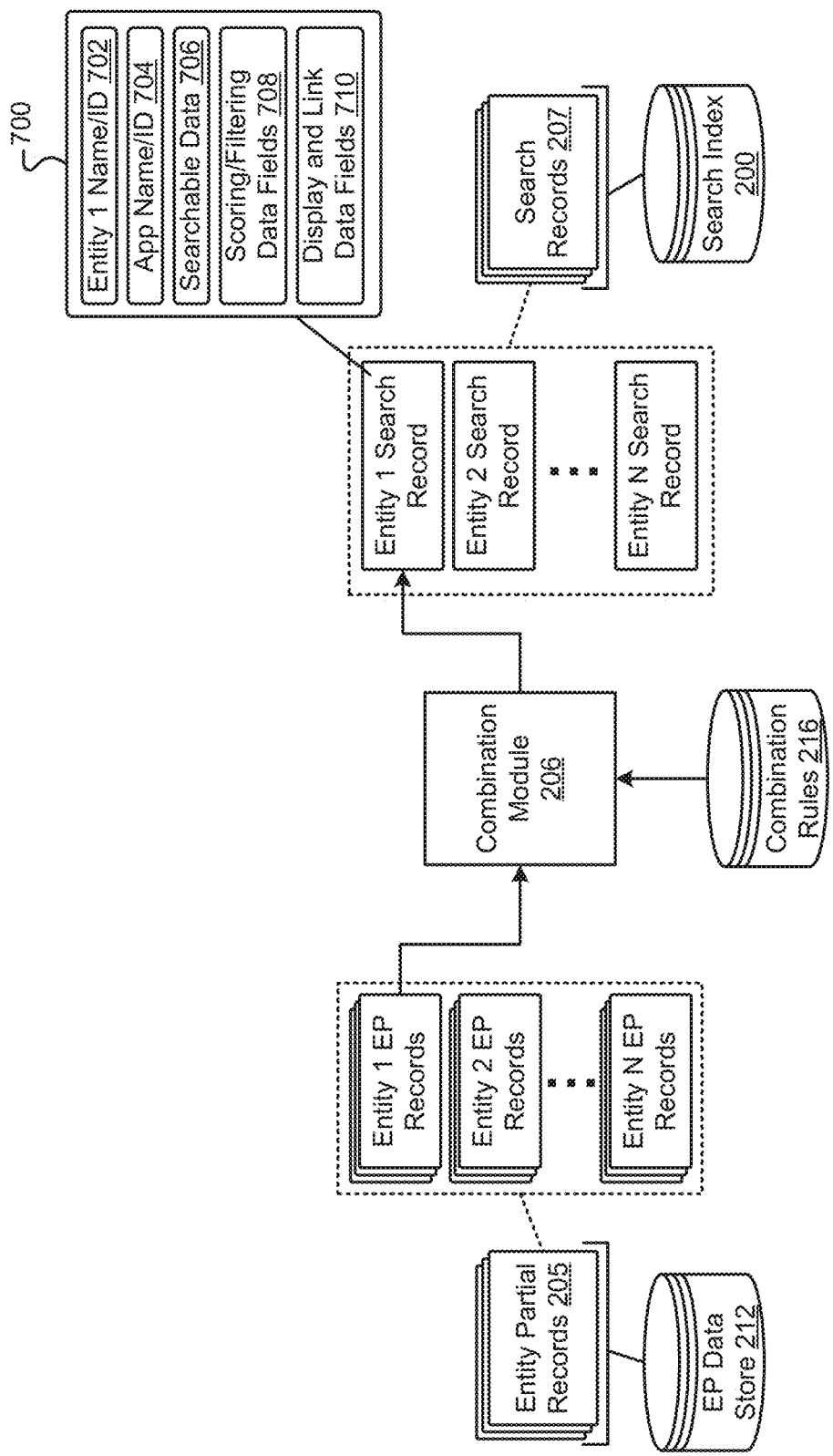
FIG. 7A is a functional block diagram of an example combination module that generates search records.
Figure 7B:
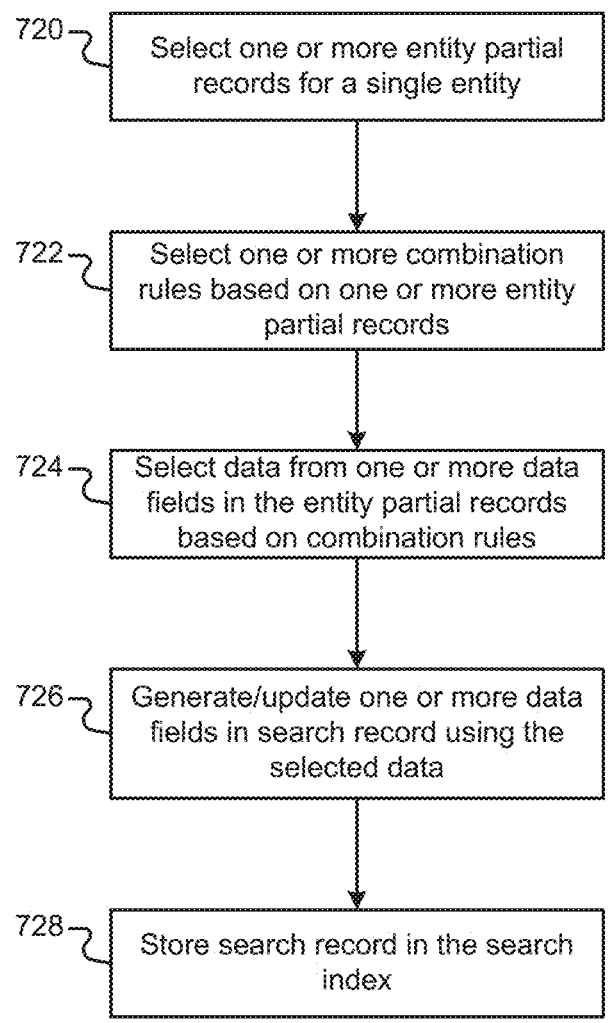
FIG. 7B is an example method for generating a search record from multiple entity partial records.
Figure 7C:
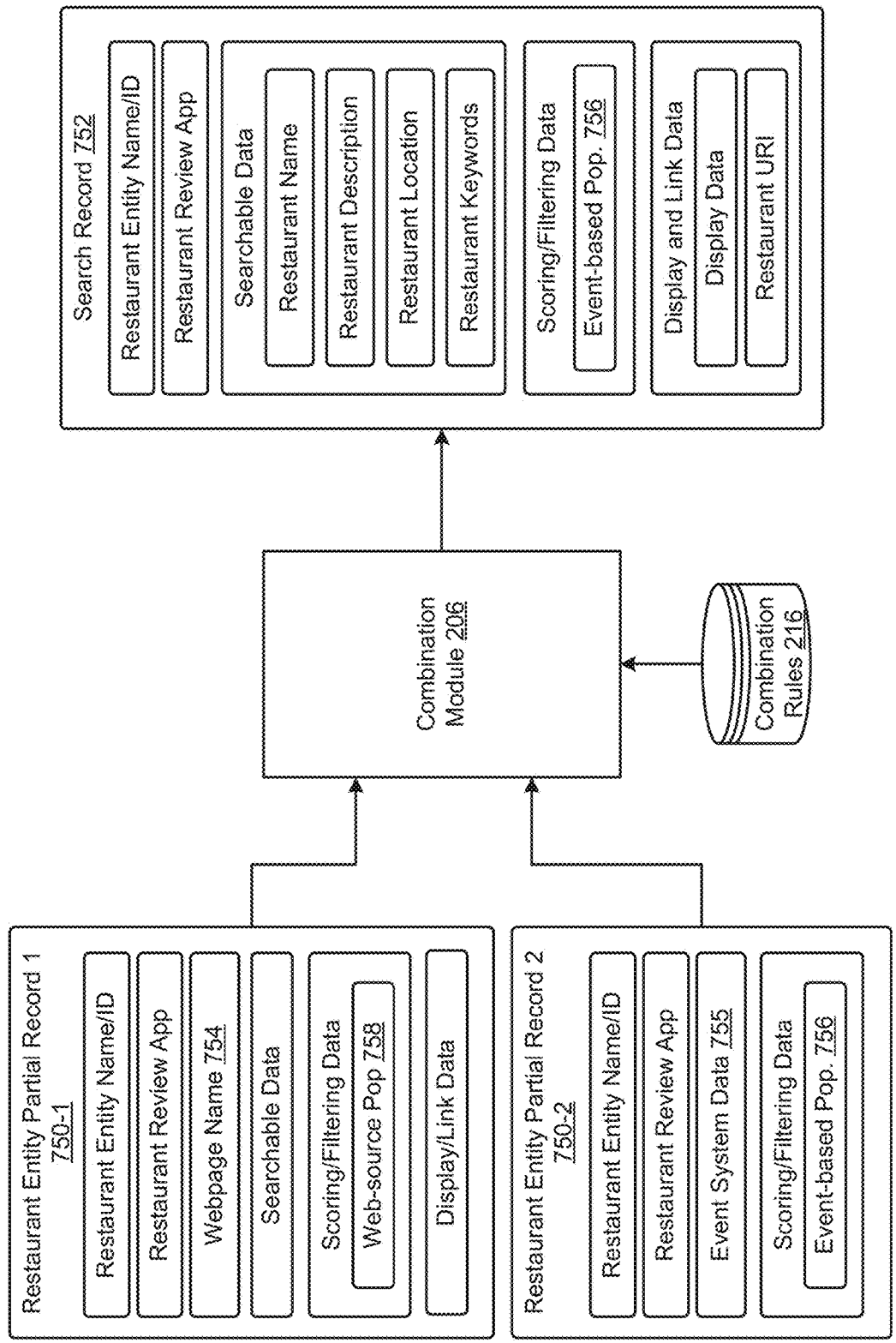
FIG. 7C illustrates generation of a search record from two entity partial records.
Figure 8:
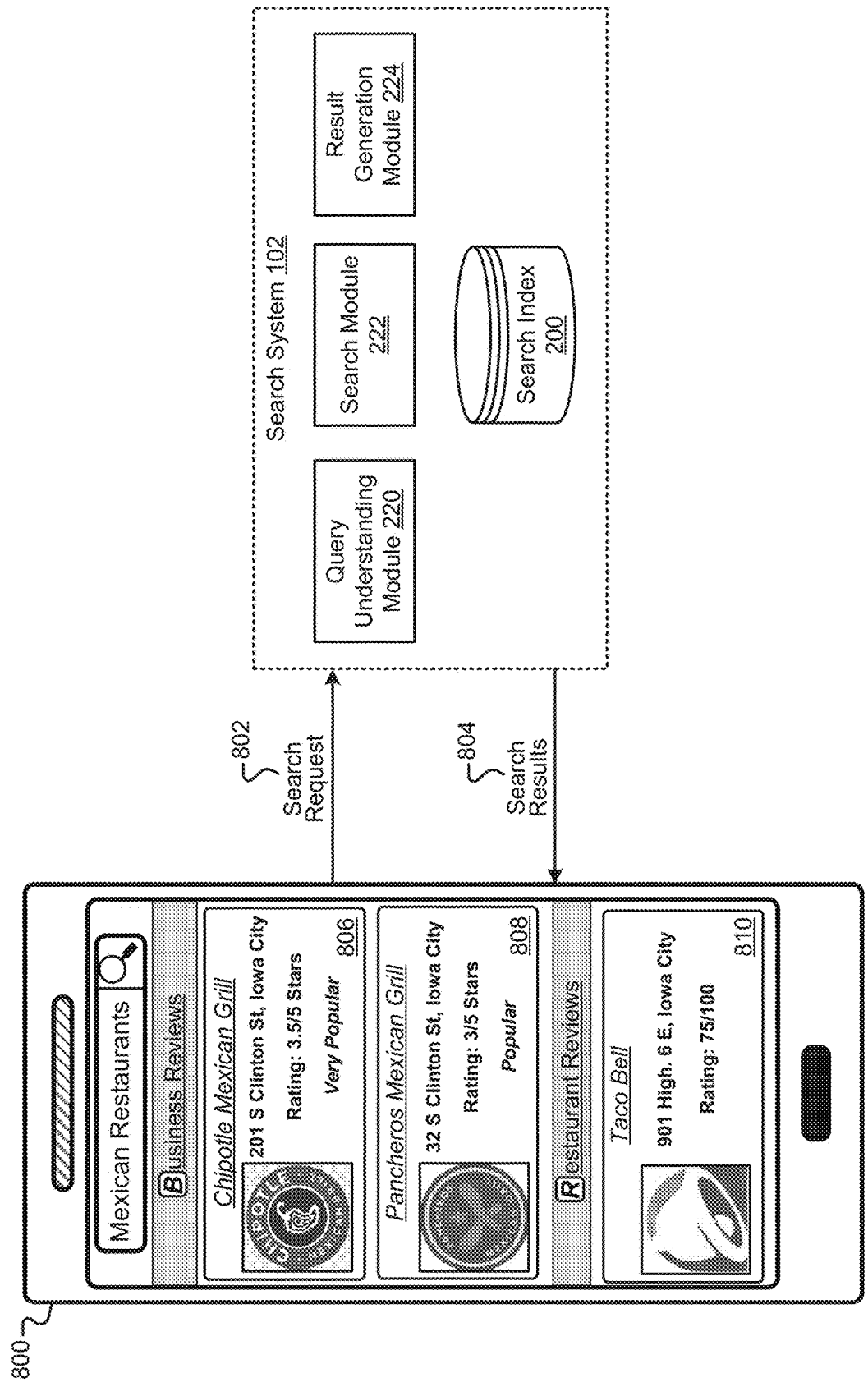
FIG. 8 illustrates an example search result page on a user device.
Figure 9A:
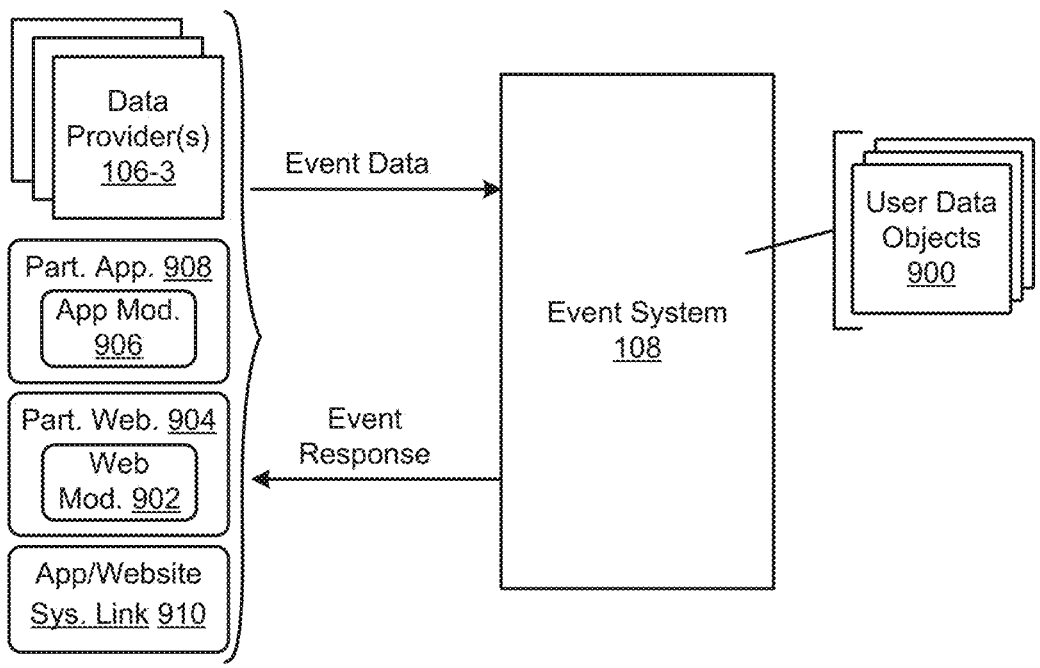
FIGS. 9A-9B illustrate an example event system and user data object.
Figure 9B:
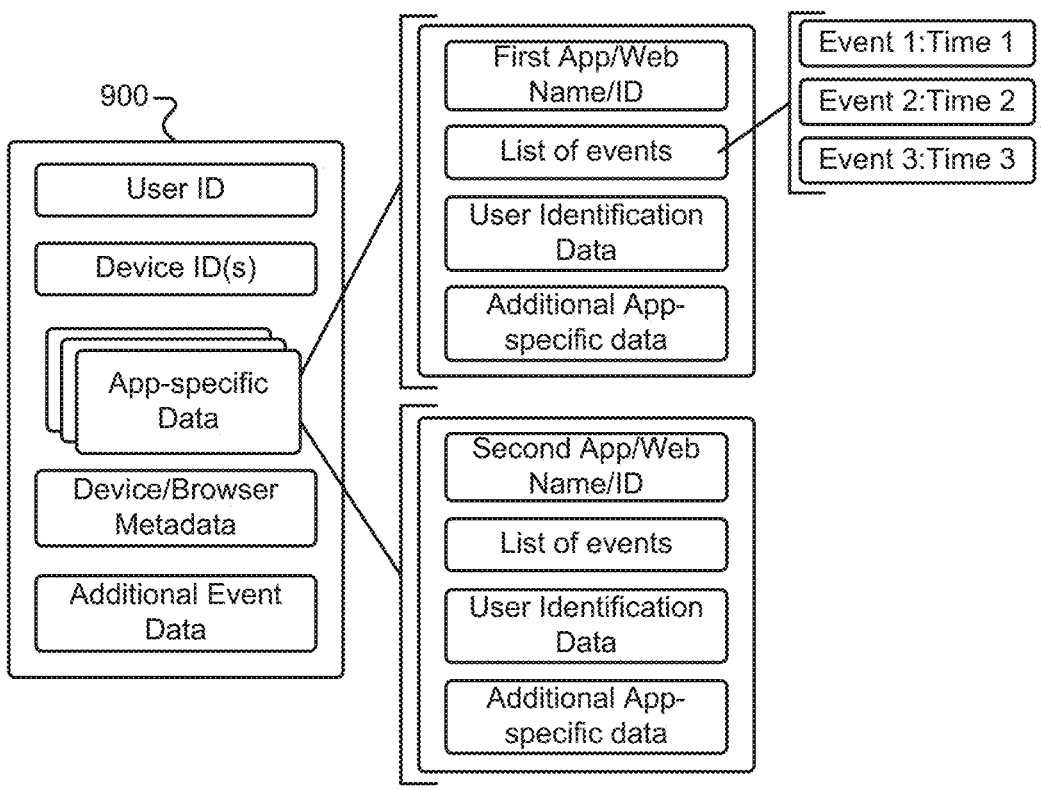

FIGS. 4-9B illustrate features of an example index generation system 100, an example search system 102, and an example event system 108. FIG. 4 is an example method that describes operation of the index generation system 100 and the search system 102. FIGS. 5A-5C illustrate operation of an example extraction module 202. FIGS. 6A-6C illustrate operation of an example formatting module 204. FIGS. 7A-7C illustrate operation of an example combination module 206. FIG. 8 illustrates operation of an example search system 102 that includes a search index 200 generated by the index generation system 100. FIGS. 9A-9B illustrate an example event system 108.

FIG. 4 illustrates an example method that describes operation of the index generation system 100 and the search system 102. In block 400, the extraction module 202 generates VS records 203 based on the data sources 106. In block 402, the formatting module 204 generates EP records 205 based on the VS records 203. In block 404, the combination module 206 generates search records 207 based on the EP records 205.

In block 406, the search system 102 receives a search request from a user device 104. In block 408, the search system 102 generates search results based on the received search request. In block 410, the search system 102 sends the search results to the user device 104. In block 412, the user selects a displayed search result and the user device 104 accesses the application state associated with the search result.

Figure 5A:
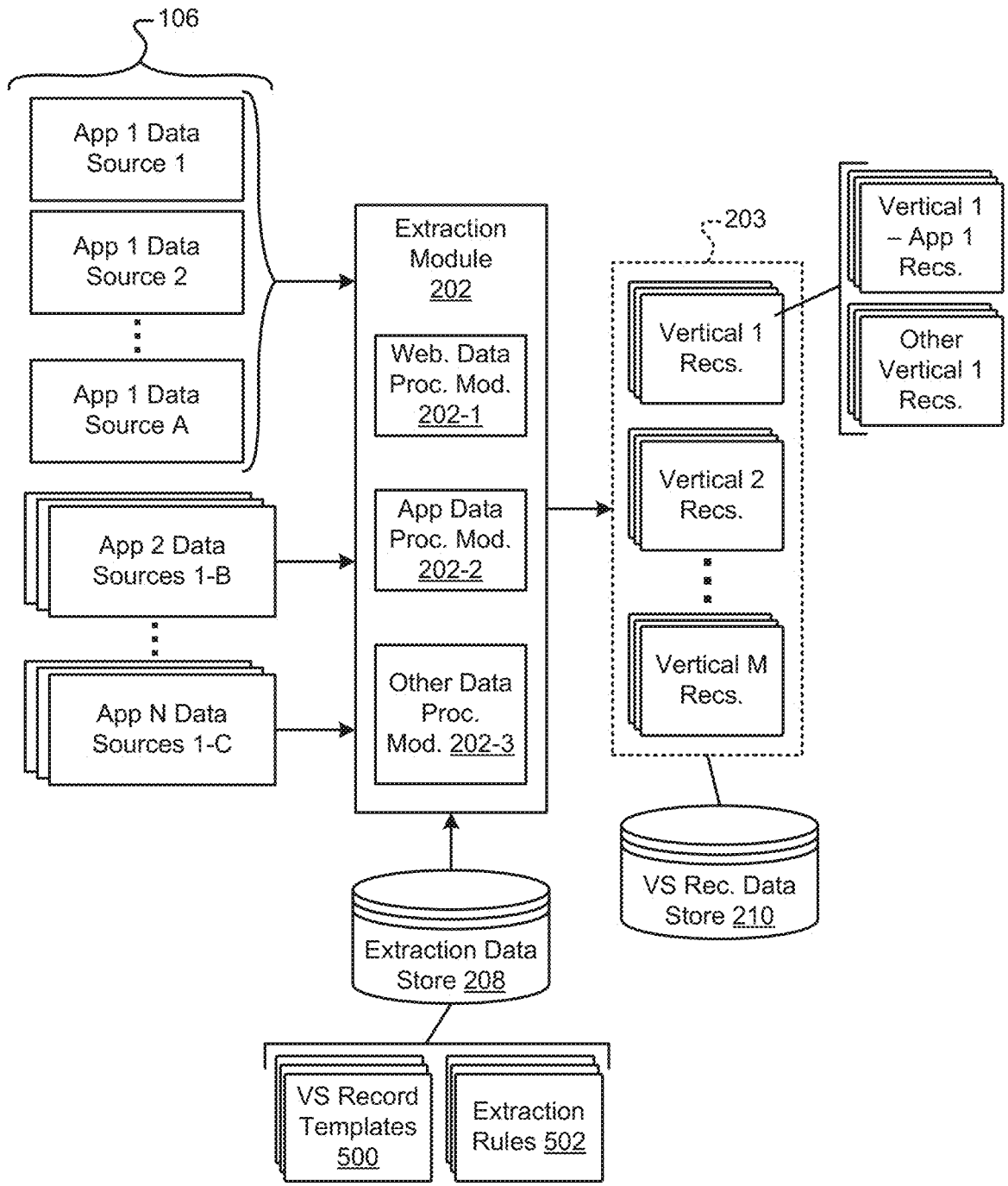
FIGS. 5A-5B are functional block diagrams of an example extraction module that generates vertical-specific records.
Figure 5B:
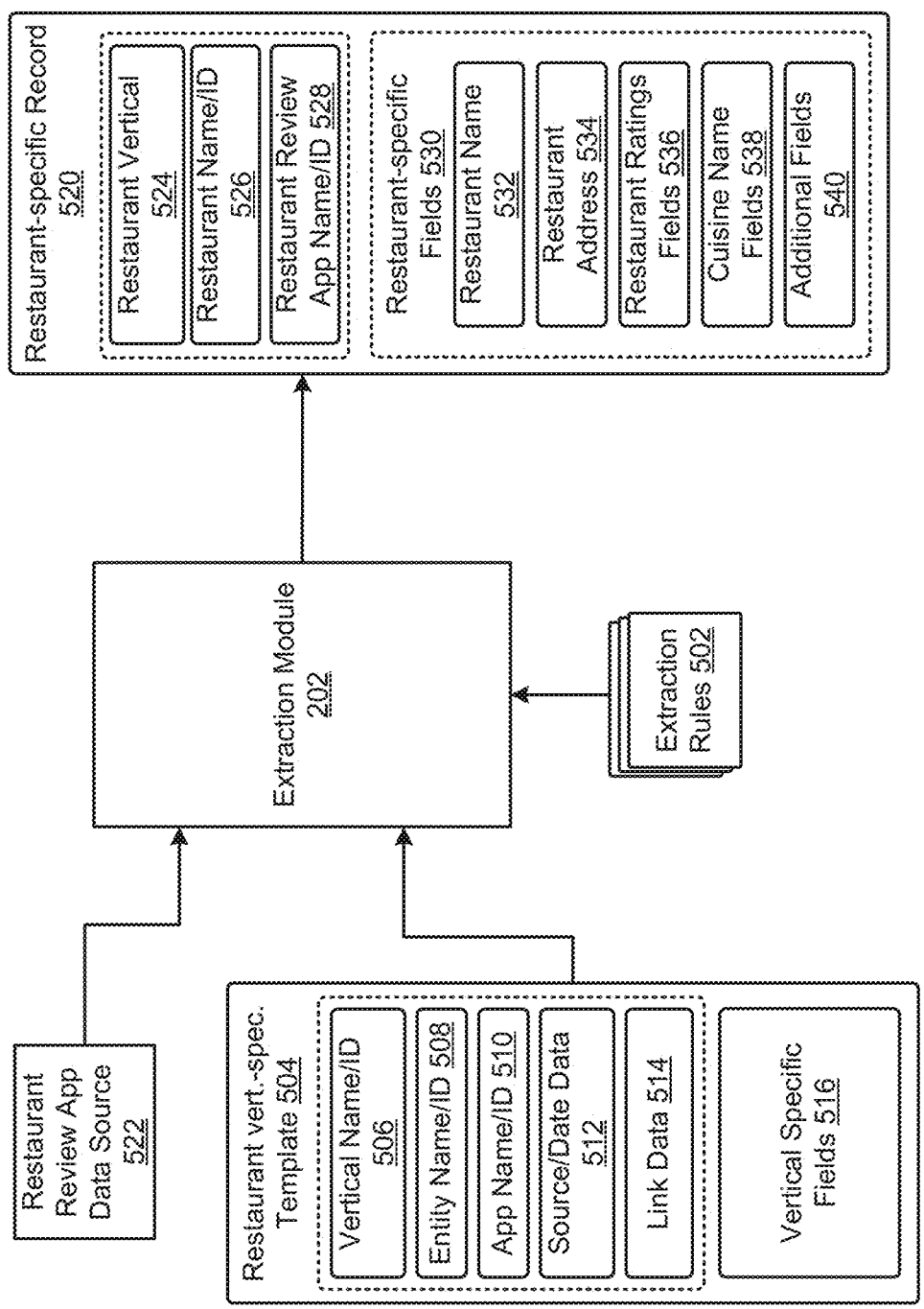

Referring to FIGS. 5A-5B, the extraction module 202 extracts data from the data sources 106 and generates VS records 203 based on the extracted data. The data sources 106 include a plurality of different data sources for each application of N different applications. For example, application App 1 includes data sources 1, 2, . . . , and A. Applications App 2 and App N include data sources 1-B and 1-C, respectively. The extraction module 202 may include a web data processing module 202-1, an application data processing module 202-2, and another data processing module 202-3 that may extract data from web data sources, application data sources (e.g., API calls), and other data sources, respectively.

FIG. 5A illustrates a plurality of VS records 203 for each vertical of M different verticals. For example, verticals 1, 2, . . . , and M each include a plurality of VS records. The example vertical records 203 are stored in the VS record data store 210. Variables A, B, C, N, and M in FIG. 5A may be integers that are greater than 1. Although multiple data sources are illustrated for each application, in some implementations, an application may have a single data source.

The VS records 203 may have vertical-specific schema. For example, VS records associated with the same vertical may have the same (or similar) set of data fields, whereas VS records associated with different verticals may have different data fields. In a specific example, VS records for a music vertical may have the same (or similar) data fields. In this specific example, VS records for a restaurant vertical may have the same (or similar) data fields as other restaurant VS records, but may have a different set of data fields than the music vertical. For example, a VS record for a restaurant vertical may have data fields for dining times, cuisine types, a postal address, etc. As another example, a VS record for a music vertical may have data fields for artist name, song title, runtime, music genre, etc.

Although the set of data fields in the VS records 203 may be specific (e.g., unique) to the vertical, the VS records 203 may include some common fields across different verticals. In one example, the VS records may share common fields, such as a vertical name/ID field, an entity name/ID field, an application name/ID field, a source data field, a date data field, and a link data field. As another example, in some implementations, a subset of the data fields across VS records from multiple verticals may be the same, although the complete set of fields for VS records in different verticals may differ. For example, VS records for a restaurant vertical and a movie vertical may have star ratings fields for the restaurants and movies, respectively. However, the restaurant VS record and the movie VS record may have some different fields, such as a "Drive through time" field and a "Movie runtime" field, for example.

In some implementations, VS records in different verticals may have fields with the same name, but different semantic meanings, which may be based on the vertical. In one example, a music entity may have a field called "number of plays," which may indicate the total number of times the song has been played. In this example, a video game entity may have a field called "number of plays," which may indicate the number of games a user has played on their phone.

In some implementations, some VS records may include data fields that are unique to the vertical (e.g., not included in other VS records). For example, a movie vertical may have a field for "Academy award best actor name," whereas other verticals may not have such a field. Accordingly, VS records 203 may share some of the same data fields, but differ among different verticals because of the presence of additional different fields, some of which may be unique.

The extraction data store 208 includes VS record templates 500 for each vertical. The extraction data store 208 also includes extraction rules 502 for completing the VS record templates 500 using data from the data sources 106. For example, the extraction module 202 may generate a VS record 203 by inserting values from the data sources 106 into the VS record template fields according to one or more extraction rules 502.

FIG. 5B illustrates an example VS record template 504 that is completed using extracted data. The example VS record template 504 includes a vertical name/ID field 506. The vertical name/ID field 506 may include a vertical name and/or vertical identifier (ID) that identifies (e.g., uniquely identifies) the vertical associated with the VS record. In some implementations, the vertical name/ID may include a string of alphabetic, numeric, and/or symbolic characters (e.g., punctuation marks) that can be used to identify (e.g., uniquely identify) the vertical. In some implementations, the vertical name/ID may include the name of the vertical in human-readable text.

The example VS record template 504 includes an entity name/ID field 508. The entity name/ID field may include an entity name and/or entity identifier (ID) that identifies (e.g., uniquely identifies) the entity associated with the VS record. In some implementations, the entity name/ID may include a string of alphabetic, numeric, and/or symbolic characters (e.g., punctuation marks) that can be used to identify (e.g., uniquely identify) the entity. In some implementations, the entity name/ID may include the name of the entity in human-readable text.

In some implementations, the entity may be an application-specific ("app-specific") entity, which may refer to an instance of an entity within an application. Example app-specific entities may include a specific song in a music streaming application, a specific restaurant in a review application, and a specific hotel in a hotel reservation application. With respect to app-specific entities, each application may use its own app-specific entity name/ID schema. For example, an application may use an entity name/ID that identifies the entity within the specific application, such as an app-specific name and/or app-specific ID. In some implementations, the entity name/ID may include a portion of the URI used to access the entity in the application, such as a portion of the URI that identifies the entity in the application. In a specific example, a review application may use app-specific IDs (e.g., business IDs) in a URI scheme that accesses the different entities. In some implementations, the entity name/ID may include the URI for the application state from which the VS record data was extracted.

In some implementations, an application may include multiple application states associated with the same entity. For example, a business review application that provides business reviews may include multiple application states (e.g., pages) for a specific business. In a specific example, the business review application may include a first application state and a second application state that provide a description of the business and reviews for the business, respectively.

The extraction module 202 may generate a single entity ID that maps to multiple application states for the same entity. For example, the extraction module 202 may generate the same entity ID for two different VS records from two different application state sources. In some implementations, the extraction module 202 may implement a URI identification extraction rule that determines when two different URIs are for the same entity. In one example, assuming that there is a main application state for a restaurant and a reviews page for the restaurant in the same application, the extraction module 202 may determine that the URIs are associated with the same entity. The extraction module 202 may then assign the same entity ID to the two different VS records, where the entity ID may be a normalized URI used for the sources associated with instances of the restaurant in the application. In some cases, determination that two data sources are for the same entity may be hardcoded into the extraction rules. In some implementations, the result of an extraction rule may be an entity ID, and as a result, the extraction rules may cause two different data sources to have the same entity ID, possibly including different information. In other cases, determination that two data sources are for the same entity may be performed based on partially similar URIs. In some implementations, instead of generating the entity ID at the extraction module 202, the formatting module 204 may generate the entity ID. For example, the formatting module 204 may generate the entity ID according to one or more formatting rules (e.g., using hardcoded rules and/or other logic). The formatting module 204 may use similar techniques for generating the entity ID as the extraction module 202 in some cases.

The example VS record template 504 includes an application name/ID field 510. The application name/ID field 510 may include an application name and/or application identifier (ID) that identifies (e.g., uniquely identifies) the application associated with the VS record (e.g., the app that includes the entity). In some implementations, the application name/ID may include a string of alphabetic, numeric, and/or symbolic characters (e.g., punctuation marks) that can be used to identify (e.g., uniquely identify) the application. For example, the application name/ID may be assigned by the developer and/or the operator of the index generation system 100. In some implementations, the application name/ID may include the name of the application in human-readable text.

The example VS record template 504 includes a source data field 512 and a date data field 512. The source data field 512 may indicate the source of the data extracted for the VS record. Example source data may indicate the type of source, such as whether the source is a website, application, API, or third-party data source. The source data may also include additional information, such as specific web domains (e.g., Wikipedia.com or Amazon.com), application names, API names, and third party data source names (e.g., the event system 108). The source data may be manually coded into the extraction rules and/or determined at extraction time.

The date data 512 may include a date the data was extracted from the data source to generate the VS record. Additionally, or alternatively, the date data may indicate a date associated with the extracted content, such as a date of a news article included in the content.

The example VS record template 504 includes link data 514 (e.g., a deeplink URI). In some implementations, the extraction module 202 may extract link data 514 from the data source. Example link data may include an application link (e.g., application URI) that the user device may use to access the entity (e.g., app-specific entity) associated with the VS record. For example, the link data may be used by the user device to launch an application to the application state associated with the entity. In some implementations, the extraction module 202 may generate the link data 514 based on data extracted from the data source. For example, the extraction module 202 may identify one or more app-specific IDs (e.g., an entity ID) in the extracted data, and then fill in a URI template with the app-specific ID(s) to generate an application link to the entity. The URI may also be constructed from other metadata included in the extracted data. In some implementations, the link data 514 may include instructions that cause the user device (e.g., search application and/or OS) to trigger other on-device actions, such as opening the camera application, taking a picture using the camera application, turning on a Bluetooth® functionality, etc.

The example VS record template 504 includes one or more vertical-specific data fields 516. The one or more vertical-specific data fields 516 may include common fields and/or unique fields described herein. The vertical-specific data fields 516 may each include a field name that indicates the data included in the field. The vertical-specific data field names may be generated by the operator of the index generation system 100. The extraction module 202 may extract one or more values from a data source and assign the extracted value(s) to one or more of the vertical-specific data fields to generate a VS record. The fields can include any type of data and data structure (e.g., integers, text, arrays, etc.).

The VS records 203 may include a plurality of vertical-specific data fields 516 that capture data across a plurality of applications and content sources. Additionally, the vertical-specific data fields 516 may be configured to acquire data from the plurality of applications and data sources with minimal processing. In order to accommodate efficient extraction of numerous similar data fields from applications within a single vertical, a single VS record template 504 may have a plurality of fields that are configured to receive similar data from one or more applications. For example, VS records for a restaurant vertical may have multiple data fields for different ratings systems across applications (e.g., number of thumbs up ratings, 3 star scale ratings, 5 star scale ratings, decimal number ratings, number of reviews, etc.). The presence of multiple data fields that are configured to receive different data from different applications may result in VS records that are sparsely populated. For example, a VS record may have a majority of fields (e.g., greater than half) that are not completed (e.g., empty) after extraction from a single data source that includes data for a single application. This may occur because the single application may not possess data for all the possible vertical-specific fields for the plurality of different applications within the vertical.

In one specific example, applications that provide business reviews may have a plurality of different types of ratings, which may convey similar information, but in an application-specific manner. For example, business reviews may have ratings count metrics, review count metrics, number of thumbs up metrics, number of votes metrics, etc. All of these example metrics may each have their own field in a VS record template, but a single data source may provide only a single one of the metrics, depending on whether the data source is for a single application and/or whether the data source provides a complete accounting of the application's ratings.

A plurality of data sources may yield a corresponding plurality of VS records for a single entity. For example, event data sources and/or multiple websites within a domain may yield a plurality of different corresponding VS records for a single entity. A plurality of VS records for the same entity may provide a more complete data profile for the entity within the vertical.

In some cases, there may be overlap between data in the fields in different VS records if different data sources provide overlapping information. For example, each restaurant data source may provide geolocations and addresses for a restaurant. In this example, different VS records generated from the different data sources may each have completed geolocation and address data fields with the same information.

The extraction module 202 extracts data from the data sources 106 and generates VS records based on extraction rules 502. The extraction rules 502 may define the acquisition/processing of source data to generate data for the one or more predefined VS record fields. For example, the extraction rules 502 may define which data should be extracted from the data sources 106. The extraction rules 502 may also define which data fields in the VS record should receive the extracted data and whether/how the extracted data should be processed before insertion into the VS record template.

In some implementations, the extraction module 202 may generate a single VS record for a single data source. For example, the extraction module 202 may generate a single VS record for a single webpage that includes information for a single entity within an application. Other example single data sources may include a single API call, a single application page, and a single third-party data source that indicates usage data for a single webpage and/or corresponding application state. As described herein with respect to the formatting module 204 and the combination module 206, the single entity ID associated with a VS record may pass to a single EP record and ultimately to a search record in the search index 200. Although the extraction module 202 may generate a single VS record for a single data source, in some implementations, the extraction module 202 may generate multiple VS records for a single data source, such as when the single data source (e.g., webpage) includes data for multiple entities from the same or different applications. Similarly, in some implementations, the formatting module 204 may generate multiple EP records for a single data source (e.g., VS record), such as when the single data source includes multiple entities for the same or different applications.

In some implementations, the extraction module 202 may input the extracted values into the VS record without additional processing. In some implementations, the extraction module 202 may perform some processing on the extracted values, such as a change in value types. In some implementations, the extraction module 202 may perform normalization operations on the extracted data and/or implement cleaning rules, such as a rule that removes some words. The inclusion of multiple vertical-specific data fields in a VS record may help minimize the amount of processing used to fill the fields, thereby increasing the efficiency of extraction.

The extraction module 202 may include various types of extraction rules 502. Some extraction rules may include regular expressions, such as rules that extract the number following the text "Review Count", which may be represented as a standard regular expression format: /Review Count: ([\d]+)/. Other example rules may include extensible markup language (XML) path language (XPath) expressions, which may include "//*[contains(concat(" ", @class, " "), concat(" ", "tjvcx", " "))]" and specify a rule for how to parse the document object model (DOM) of a webpage. Other example rules may include field name mappings between an API output and destination fields, such as API:name→OUTPUT:restaurant_name. In some implementations, rules can be defined based on a standard document structure, such as JavaScript Object Notation for Linked Data (JSON-LD). For example, the rules may extract the schema.org field of an address from a webpage that follows the JSON-LD data.

In some implementations, processing rules may be applied to one or more extracted fields. For example, a webpage may list the number of reviews as 123,456, which may be cleaned to 123456 before being converted to an integer type, satisfying a formatting requirement of the VS record schema. In some implementations, processing of extracted fields can include removing text, such as the application name. For example, for a restaurant review application, the title of a document may be "Restaurant-Reviews.Com—McDonalds", and a rule may specify removal of everything before the hyphen (e.g., the application name). In some implementations, extraction rules may combine their output to form a resultant field. For example, a document may have latitude and longitude separated in the document. In this example, there may be two extractor rules, one for extracting the latitude (e.g., a regular expression: /Lat: ([\d\-\.]+)/) and one for the longitude. There may also be a third rule to combine extracted fields together to form a proper geolocation tuple (<latitude>, <longitude>). In some implementations, post-extraction text processing rules may be applied, such as keeping only the first n letters, or removing newline characters and replacing them with spaces.

The extraction rules 502 may indicate which of the one or more vertical-specific data fields to populate with the extracted data. In some implementations, the extraction rules 502 may populate a single vertical-specific data field with extracted data from a single data source. In some implementations, the extraction rules 502 may populate multiple vertical-specific data fields with extracted data from a single data source. In some implementations, multiple extraction rules may be combined to produce one vertical-specific data field.

The extraction module 202 can use one or more rules per data source to extract the data to the VS record. In one example, a single extraction rule may extract data for one or more fields in the VS record. In another example, multiple extraction rules can work together to combine data into a single field in the VS record. In a specific example, first and second extraction rules may acquire an address and a city name, respectively, from the same data source. The first and second extraction rules may specify that the acquired data should then be combined for the address field in a single VS record.

The extraction rules 502 may define data extraction operations for a variety of data sources 106. In some implementations, the data sources 106 may include structured data, such as data received via API calls. Structured data may also be provided by the event system 108 and the data providers. In some implementations, the extraction rules 502 may define data extraction operations for semi-structured and/or unstructured data. For example, some data sources (e.g., documents) may include some semi-structured or unstructured elements. In some cases, documents may include both structured and unstructured data, such as the JSON-LD standard that encodes schema.org data into a webpage, combined with the unstructured text data outside of JSON-LD block.

The extraction rules 502 may be generated manually and/or automatically. For example, the extraction rules 502 may be manually coded for some data sources. As another example, the extraction rules 502 may be generated by a combination of human and automatic methods (e.g., machine learning). In some implementations, automatic rules may attempt to predict an extraction rule and ask a human to validate. For example, a machine learned algorithm may scan several documents from a website looking for numbers that could be longitude and latitude, and as a result, produce a regular expression to extract the longitude and latitude. A human may validate the rule is correct. As another example, there may be common ways applications in the same vertical specify certain data. For example, many applications may have the number of reviews followed by the word "Reviews" (e.g., "124,560 Reviews"). Machine learning algorithms may use this information from some already known applications to predict how to extract the data from new applications. A human may be asked to validate if the results are correct, and possibly make changes to the automatically generated rules.

FIG. 5B illustrates an example restaurant-specific record 520 with example data fields extracted from a restaurant review application data source 522, such as a webpage for the restaurant, an API call, or the event system 108. The restaurant-specific record 520 includes "Restaurant" in the vertical name/ID field 524. The VS record includes the name/ID for the specific restaurant in the entity name/ID field 526. The VS record also includes the restaurant review application name in the application name/ID field 528. The VS record includes a plurality of different restaurant vertical-specific data fields 530. For example, the fields may include the restaurant name 532, restaurant address 534, one or more restaurant ratings 536, one or more cuisine names 538, and other additional fields 540.

Figure 5C:
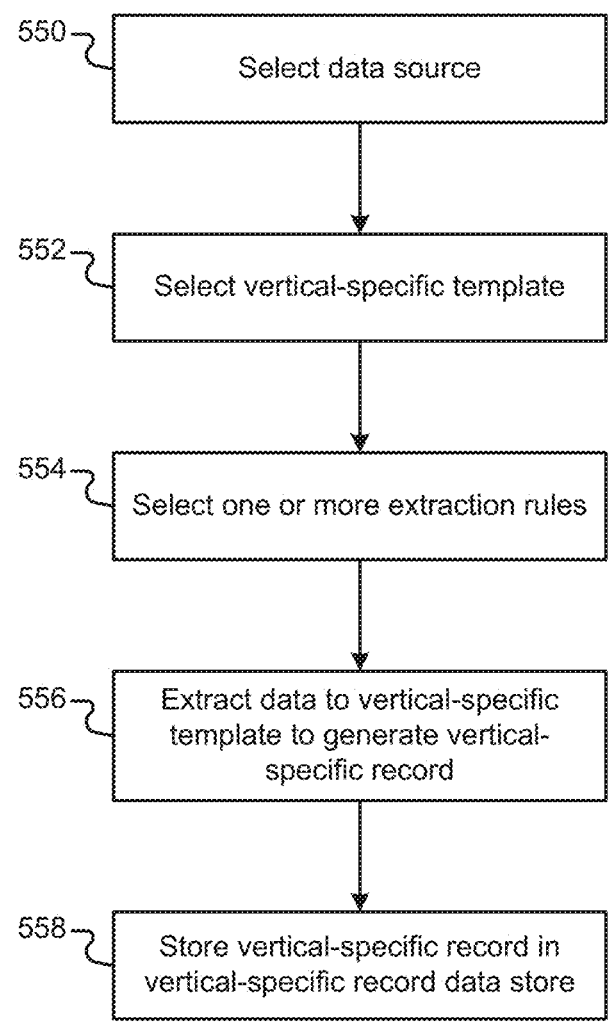
FIG. 5C is an example method for generating a vertical-specific record from a data source.

FIG. 5C illustrates an example method for generating a VS record. In block 550, the extraction module 202 selects a data source. In block 552, the extraction module 202 selects a vertical specific template based on the data source vertical. In block 554, the extraction module 202 selects one or more extraction rules 502. In block 556, the extraction module 202 extracts data from the data source to the vertical-specific template to generate a VS record. In block 558, the VS record is stored in the vertical specific record data store 210.

Referring to FIGS. 6A-6B, the formatting module 204 generates EP records 205 based on data included in VS records 203. For example, the formatting module 204 may generate a single EP record based on a single VS record according to one or more formatting rules 214. Although the formatting module 204 may generate a single EP record based on a single VS record, as illustrated in FIG. 6B, the formatting module 204 may generate multiple EP records based on a single VS record in some examples. For example, if the VS record is for a shopping application, the VS record may include a list of products that each may receive their own EP record.

An EP record may include partial data for an entity (e.g., an app-specific entity) in that the EP record may be combined with other EP records to generate a final search record for an entity. The final search record may include more complete information for the entity, as it may include data from multiple combined EP records. As described herein, the EP record for an entity may include the same fields as the search record for an entity. Although the EP record may include the same fields as the search record, the search record may include more completed fields due to the combination of data from multiple EP records. The EP record may include additional fields that may not be present in the search records, such as source data field and a date data field that indicate the source of the EP record data and the date associated with the EP record data.

The formatting module 204 generates EP records 205 according to formatting rules 214. For example, the formatting module 204 may extract data from a VS record and complete one or more fields in an EP record (e.g., EP record template) according to the formatting rules 214. Over time, the formatting module 204 may extract data from a plurality of VS records and generate EP records that may be used to generate/update the search records 207 in the search index 200. The entity partial data store 212 stores the generated/updated EP records. An example EP record template 600 and an example EP record 602 are illustrated in FIG. 6B.

An example EP record 600 may include an entity name/ID 602 indicating the entity (e.g., app-specific entity) associated with the EP record 600. The entity name/ID 602 may be extracted from the VS record used to generate the EP record. If the entity name/ID is not available in a VS record, the formatting module 204 may generate the entity name/ID. Note that a single entity name/ID may be unique for an application. Also note that each entity name/ID may have a plurality of associated EP records. The example EP records of FIG. 6A are illustrated as grouped by entity name/ID in order to convey that the formatting module 204 may generate a plurality of EP records that may be indexed by entity name/ID, along with other data (e.g., source/date data). The combination module 206 may generate a search record for an entity by combining EP record data from multiple EP records associated with the same entity.

The example EP record 600 may include an application name/ID 604 that indicates the application that includes the entity. The example EP record may also include a source/date data field 606. The source data field may indicate the source of the data. The date data field may indicate a date included in the source data and/or a date of acquisition by the index generation system 100. In some implementations, the entity name/ID 602 and source/date 606 data pair may form a unique identifier for the EP record among a plurality of EP records. The source data may include a source type (e.g., website, API) and also a source name (e.g., a domain name for a website source type).

The example EP record 600 may include searchable data 608 that may be included in the search records 207. The searchable data 608 may include text and/or numbers that the search system 102 may use to identify and score/rank search records at search time. Example searchable data may include application content, such as keywords, a business name, a description of the application state (e.g., a business description), a location name, an application name, a vertical name, searchable full text, geographic coordinates, or other numerical data, such as a document embedding vector. In some implementations, the search system 102 may identify and score/rank the search records based on matches between terms of the search query and terms in the searchable data.

The example EP record may include scoring/filtering features 610. In some implementations, the scoring and/or filtering features 610 may include numerical scoring features. Example scoring features may include ratings numbers, popularity, and other metrics described herein, such as usage metrics. Other examples may include topic vectors that may be compared to a query.

The example EP record may include display data and link data 612. Display data 612 may include data that may be used by the search application 122 (or web browser 118) to render a search result link associated with the entity. Example display data may include a display name, an application name, a short description, and one or more graphics (e.g., icons/images). The link data 612 may include URI data (e.g., a deeplink) that accesses the application state associated with the entity. The search application 122 may use the link data to access the application state in response to user-selection of the search result.

Some data may be included in multiple data fields in the EP Record. For example, some features may be both searching features and scoring/filtering features. In a specific example, a geolocation may be a searching feature and a scoring feature that can be used to identify a search record and determine how to score/filter the search record.

In some implementations, the formatting module may acquire VS records in real-time when the VS records are generated. In these implementations, additions/updates to data sources may cause generation of additional VS records, which may lead to the generation/update of search records. In some implementations, the formatting module 204 may process the VS records in batches. For example, the formatting module 204 may be configured to process the VS records at predetermined times, predetermined intervals, and/or in response to the generation of a threshold number of VS records.

The formatting module 204 may select one or more formatting rules 214 for generating an EP record in response to generation of a VS record. The formatting module 204 may select the one or more formatting rules 214 based on the fields of the VS record. In some implementations, the formatting module 204 may select one or more formatting rules based on which fields of the VS record are defined. The formatting module 204 may then complete one or more fields in the EP template 600 based on the selected formatting rule(s) and VS record. In some implementations, formatting rules may combine outputs to produce one or more fields in the EP template. For example, the EP template may include a "keywords" field, which is an array of keywords, and one formatting rule may add the VS field's cuisines as keywords, while another formatting rule may add the restaurant name to the keywords.

The formatting module 204 may include formatting rule selection criteria that, if satisfied, cause selection of the formatting rule(s) by the formatting module 204. Example formatting rule selection criteria may define specific fields that may trigger selection of a formatting rule. For example, a formatting rule may be selected when a specified set of fields for a specific formatting rule are available in the VS record. In some implementations, formatting rule selection criteria may include prioritization criteria. For example, in the case that multiple formatting rules are selected for the VS record, prioritization criteria may indicate a priority order for formatting rules. Example prioritization rules may include selection of the formatting rules that can use the most data fields in the VS records and/or formatting rules that can use the most specific fields in the VS records.

In some implementations, the formatting rules may include vertical-specific formatting rules that are used to generate EP records for specific verticals. For example, a vertical-specific formatting rule for the restaurant vertical may be used to generate an EP record for a restaurant VS record. In some implementations, the formatting rules may include application-specific formatting rules that are used to generate EP records for specific applications. For example, an application-specific formatting rule for a specific application may be used to generate an EP record for a VS record associated with a specific application. In some implementations, the formatting rules may include app/vertical specific formatting rules that are used to generate EP records for VS records associated with a specific vertical and a specific application.

In some examples, the formatting module 204 may populate a single field in the EP record from a single field in the VS record. In other examples, the formatting module 204 may populate multiple fields in a single EP record from a single field in the VS record. In other examples, the formatting module 204 may combine data (e.g., union data) from multiple fields in a VS record to generate a single field in the EP record.

In some implementations, the fields can be directly copied from VS record to EP record. In some implementations, the formatting module 204 may perform some processing on the VS field data before using the data to populate the EP record field. Example processing may include, but is not limited to, lemmatization and normalization. Example normalization may include case normalization and removal of punctuation. The lemmatization and normalization functions may be used across a plurality of different VS records (e.g., all of the VS records). Maintenance of an index generation system 100 that includes widely applied formatting rules may generally be more efficient than coding specific rules for specific verticals and applications. Although some functions (e.g., lemmatization/normalization) may be used across multiple verticals, in some implementations, some functions used to generate EP data from VS records may be custom to vertical and/or application, as described herein.

In one example, a formatting rule may process a numeric field, such as the number of ratings, and convert it to a popularity score from 0 to 1. This example rule may perform mathematical operations, such as to divide by a maximum rating count specified per application. This example rule may be the same rule that could be applied to all VS records that have a rating count, and may use the application ID to determine a normalization factor.

Another example formatting rule may include generation of a display description. Such a rule may combine multiple fields to produce the description. For example, for the shopping vertical, the rule may specify that the description field in the EP record is defined as the concatenation of the word "Buy" with the VS record field product_name, along with the word "for" and the string-conversion of the VS record field named "price."

In some implementations, formatting rules may be specified as a chain of operations applied to one or more VS record fields. For example, the EP field "keywords" may be an array of strings. A formatting rule may be defined for the restaurant vertical to chain multiple operations together. For example, the first operation may take the field named "cuisines" and convert it to an array by splitting on a comma. The second operation may be to lemmatize each entry to convert plural words to singular words. For example, "burgers" would become "burger." This may be applied to each entry in the array output from the first rule. A third rule may union the results of the second rule with the VS record field of "restaurant name." A final rule may be to lowercase all of the array entries. An initial VS Record that had a field cuisines whose value was a string: "Burgers, Pizza, Vegetarian" and a field restaurant_name: "Vegan Chef!!!" when applied to the chain of rules may produce a keywords output of ["burger", "pizza", "vegetarian", "vegan chef"].

FIG. 6B illustrates an example EP record 620 generated based on a restaurant-specific record 621. The EP record 620 is for a restaurant entity. The EP record 620 includes a restaurant entity name/ID 622 that may identify the restaurant entity in an application called the "Restaurant Review Application" 624. The EP record also includes source and date data fields 626.

The EP record 620 includes searchable data 628 for the restaurant entity. For example, the searchable data 628 may include the restaurant's name, a description of the restaurant, a location of the restaurant (e.g., street address), and keywords for the restaurant (e.g., cuisine types). The EP record 620 may also include scoring and filtering data 630, such as a popularity value that may be based on restaurant ratings and/or event data. The EP record 620 may also include display and link data 632. The link data may include a URI used to generate a search result for the restaurant entity in the application. Note that the example EP record of FIG. 6B may be partially or completely filled in from a single restaurant-specific record, depending on the amount of information included in the restaurant-specific record.

FIG. 6C illustrates an example method for generating an EP record based on a VS record and one or more formatting rules. In block 650, the formatting module 204 acquires a VS record. In block 652, the formatting module 204 selects one or more initial formatting rules based on the acquired VS record. In the case that there are multiple possible formatting rules that satisfy formatting rule selection criteria, the formatting module 204 may select one or more final formatting rules based on formatting rule selection and prioritization criteria in block 654. In block 656, the formatting module 204 processes content from the VS record based on formatting rules to generate an EP record. In block 658, the EP record is stored in the entity partial data store 212.

Although the EP record content may be generated from data sources 106 via the extraction and formatting modules 202, 204, in some implementations, some data sources may provide EP record content that is ready for ingestion by the index generation system 100 (e.g., the formatting module 204). In this example, the formatting module 204 may use data from data sources outside of the VS record to help in the generation of the EP record. Example data sources may include, but are not limited to, human curated keywords, vertical specific terms, or application name values.

FIG. 7A illustrates an example combination module 206 that may combine EP records to generate a search record. In FIG. 7A, the combination module 206 generates N search records for entities 1-N. The combination module 206 may generate each of the N search records based on one or more of the EP records. For example, the combination module 206 may generate the Entity 1 search record based on one or more of the Entity 1 EP records.

As described herein, a search record may include the same data as the EP records. For example, the search record 700 may include an entity name/ID 702, app name/ID 704, searchable data 706, scoring/filtering data fields 708, and display/link data fields 710. In some implementations, the search record 700 may include a reduced set of fields relative to the EP records. For example, the search record 700 may lack the source and date data fields that were used by the combination module 206 to make a combination decision. The search records may be stored in the search index 200.

Since the search records and EP records may include the same/similar data fields, the fields included in the search records and EP records that are the same/similar may be referred to herein as search record data fields and EP data fields, respectively. For example, the searchable data in the search record and the EP record may be referred to as "search record searchable data" and "EP searchable data", respectively.

The combination module 206 may combine multiple EP records to generate a single search record. For example, the combination module 206 may combine two or more EP records for an entity to generate a single search record for the entity. In some cases, different EP records may have data from different completed data fields. In these cases, the combination of different EP records may include the addition of the different fields into a single search record. In some cases, multiple EP records may have some of the same completed data fields. The completed data fields may have the same information or different information. In cases where the information is different, the combination module 206 may select which data to include in the search record based on combination rules. Over time, the combination module 206 may update the search records 207 with newly available data by populating previously unpopulated data fields and/or updating previously existing data in a populated field.

In some implementations, the combination module 206 may perform an operation on different EP records to produce the final index record field. Example combination operations may include taking an average, such as an average popularity of each EP record. Another example combination operation may include a union operation on array fields. For example, one EP record may have keywords of "word1", "word2", and "word3", while a second EP record for the same entity ID may have keywords of "word3" and "word4." In this example, a combination operation may produce output keywords of "word1", "word2", "word3", and "word4."

In some cases, an entity may be represented by a single EP record. In these cases, the combination module 206 may determine that only a single EP record exists for an entity. The combination module 206 may generate a search record for the single entity using the single EP record in these cases.

The combination module 206 may combine data in EP records according to combination rules 216 in order to generate a search record. In some implementations, the combination module 206 may determine how to combine the EP record data based on the source and/or the date data included in the EP records. For example, the combination module 206 may prioritize the data in one EP record/field over another based on the source of the EP records and/or the date of the EP records.

The combination module 206 may make selections based on the source of the EP record and/or date associated with the EP record. In some implementations, the combination rules may be implemented on a per EP record basis, such that all fields in the selected EP record are inserted into the search record. In other implementations, the combination rules may be implemented on a per-field basis, such that specific fields of EP records may be inserted into the search record. Additionally, one or more combination rules may be used for selection of which EP records/fields are used. Accordingly, one or more of the combination rules may be implemented at the EP record level and/or the per-field level.

In some implementations, the combination module 206 may select an EP record/field to use for the search record based on a source preference. In this example, the combination rules may indicate that specific sources are preferred over other sources. For example, there may be a ranked list of sources that indicate which sources should be used to populate the search records.

In some implementations, the combination module 206 may select an EP record/field to use for the search record based on a date preference. For example, the combination module 206 may select EP records/fields that are included in more recently generated EP records. As another example, the combination module 206 may select EP records/fields that are associated with newer content (e.g., as indicated by a date in the content of the data source). In a specific example, news articles may include a publication date that may be used for EP record/field selection.

In some implementations, the combination module 206 may select an EP record/field to use for the search record based on the source data and the date data. For example, the combination module 206 may show preference to specific sources first, and then show a preference for the most recent data. Additionally, or alternatively, the combination module 206 may show preference to the most recent data first, and then select the most preferable source of the recent data.

In some implementations, the combination module 206 may select more than one EP record/field and perform a combination. For example, the combination module 206 may perform an average or a union operation on two arrays. Other examples may include taking a maximum value, such as the most recent date, or the highest popularity among all the EP records.

Although the EP records may include source/date data that can be used by the combination module 206 in selection of EP records/fields for combination, the EP records may include additional/alternative data fields that are used by the combination module 206 for selection. For example, the combination module 206 may use any of the defined fields in the EP record to select (e.g., prioritize) EP records. In some implementations, the EP records may include additional data fields that are generated for use in selection of EP records for combination. In some implementations, the additional data fields may be generated based on other data fields in the EP record. In some implementations, the additional/alternative data in the EP records may not be included in the search records.

The additional/alternative data in the EP records may include values that indicate the reliability and/or importance of the data in the EP record. In a specific example, the combination module 206 may require greater than a threshold amount of application data (e.g., threshold number of ratings and/or reviews) to select the EP record for inclusion into a search record. Requiring a threshold number of ratings and/or reviews may prevent the use of EP records associated with small sample sizes that may not accurately represent the entity. In some implementations, the EP record may include additional values used by the combination module 206 for selection. For example, the EP record may include a confidence score, or other score, that may be determined based on one or more fields in the EP record, such as ratings, ratings numbers, number of reviews, or other data that indicates there is a sufficient sample size of data upon which the EP record data is based.

FIG. 7B illustrates an example method for combining EP records to generate a search record. In block 720, the combination module 206 selects one or more EP records for a single entity. In block 722, the combination module 206 selects one or more combination rules based on the data included in the EP records (e.g., source/date data). In block 724, the combination module 206 selects data from one or more data fields in the selected EP records based on the combination rules. In block 726, the combination module 206 generates/updates a search record using the selected data. in block 728, the search record is stored in the search index 200.

FIG. 7C illustrates the combination of two EP records 750-1, 750-2 into a single search record 752. The first EP record 750-1 includes data extracted from a webpage data source 754. Example data extracted from the webpage data source includes searchable data, scoring/filtering data, and display/link data. The second EP record 750-2 includes data extracted from the event system 108, as indicated at 755. Example data extracted from the event system 108 may include a popularity value 756 associated with the entity.

The combination module 206 combines the first EP record 750-1 and the second EP record 750-2 according to one or more combination rules 216. The search record 752 includes a combination of data from the first EP record 750-1 and the second EP record 750-2. For example, the search record 752 includes the data from the first EP record 750-1 (e.g., searchable data and display/link data), along with the popularity value 756 of the second EP record 750-2. In FIG. 7C, the first EP record (e.g., the web-based EP record) includes a web-based popularity value 758. The web-based popularity value 758 may be a function of values extracted from the webpage data, such as a function of extracted ratings (e.g., a business rating divided by a max possible rating). The second EP record 750-2 (e.g., the event-based EP record) includes an event-based popularity value 756 acquired from the event system 108. In FIG. 7C, the combination module 206 selected the event-based popularity value 756 over the web-based popularity value 758 for insertion into the search record 752. The combination module 206 may have made the selection based on a source preference for the event-based popularity value 756 relative to the web-based popularity value 758. Note that the EP record fields are the same as the search record fields, except that the source/date data field is absent from the search record 752. The search record 752 may be keyed by entity name/ID in the search index 200.

FIG. 8 illustrates an example user device 800 in communication with the search system 102. The user device 800 receives a user search query (e.g., "Mexican Restaurants") that may include one or more terms, such as one or more words, numbers, and/or symbols. The user device 800 sends a search request 802, including the search query, to the search system 102. The search system 102 generates search results 804 in response to the received search request 802. The search results 804 may include display data and link data from the search records identified during the search. The user device 800 (e.g., search application 122) renders the search results on the display based on the display data.

The search system 102 includes a query understanding module 220 that processes a received search request 802. For example, the query understanding module 220 may perform various operations on the received search query, such as tokenization, parsing, filtering, stemming, synonymization, and stop word removal. The search system 102 includes a search module 222 that can perform a search using the search index 200. For example, the search module 222 may identify a plurality of search records 207 based on matches between terms of the search query and terms in the search records 207, such as words included in the searchable data of the search records 207. The identified preliminary set of search records may be referred to as a "consideration set." In some implementations, the search module 222 may generate a preliminary score for the search records in the consideration set (e.g., based on the term matches).

The search module 222 may score the consideration set of search records (e.g., perform a secondary scoring using a scoring function/model). The scores associated with the search records may be referred to as "result scores." The search module 222 may determine a result score for each of the search records in the consideration set. The search module 222 may generate result scores for search records in a variety of different ways. For example, the search module 222 may generate result scores for search records based on the calculated preliminary scores and other scoring/filtering features, such as popularity, usage values, and geolocation of the user. The search module 222 may determine a result score based on one or more of the scoring features listed herein and/or additional scoring features not explicitly listed. In some examples, the search module 222 may include one or more machine learned models (e.g., a supervised learning model) or other scoring models configured to receive one or more scoring features.

The result scores for the search records, and associated search results, may indicate the relevance of the search record to the search request 802. For example, the result scores associated with a search record/result may indicate the relative rank of the search record/result among other search records/results. In some implementations, the result scores may be decimal values from 0.00 to 1.00, where a score closer to 1.00 may indicate that the search record is more relevant to the search request. The search results may be ordered from the highest result score to the lowest result score from the top of the user device display to the bottom. In some implementations, the search system/application may group search results by application and/or vertical.

The search system 102 includes a result generation module 224 that generates the search results 804. The search results 804 include a plurality of search result objects, each of which is associated with a single search result. The result generation module 224 can generate the search result objects based on the scored search records. For example, the result generation module 224 may select the highest scoring search records for use in generating the search results 804. The search result objects can each include link data that may route the user device 800 to an application state and/or website associated with the search record entity. The search result objects may also include display data (e.g., app-specific rendering data) that can be used to render search results on the user device. The description of search results as including multiple search result objects is for description purposes only. As such, search results may have a variety of formats, which may be similar to the search result objects described herein.

The user device 800 (e.g., search application 122) may render user-selectable search results based on the received display data. The display data may include, but is not limited to: 1) the application name, 2) the title of the result (e.g., a restaurant name), 3) a description of the state associated with the result (e.g., a description of a restaurant), and 4) one or more images associated with the application state. The display data may also specify a variety of formatting parameters, such as font size, font type, whether the font is bold/underlined, color, and position of the font and images.

FIG. 8 illustrates an example set of search results for two applications provided in response to a search query "Mexican Restaurants." A first application, referred to as the "Business Reviews" application, may provide business reviews for a variety of businesses, such as restaurants and other businesses. The Business Reviews application includes two user-selectable application links 806, 808. A first link 806 is for a Chipotle Mexican Grill restaurant located at 201 S. Clinton Street in Iowa City, Iowa. A second link 808 is for a Pancheros Mexican Grill restaurant located at 31 S. Clinton Street in Iowa City, Iowa. The second application, referred to as the "Restaurant Reviews" application, may provide restaurant reviews. The Restaurant Reviews application includes a single user-selectable application link 810 for a Taco Bell restaurant located at 901 Highway 6 E. in Iowa City, Iowa.

Selection of the application links 806, 808, 810 may cause the user device 800 to launch the respective application and access the application state (e.g., page) associated with the entity (e.g., restaurant) indicated in the rendered link. For example, selection of the Chipotle Mexican Grill link 806 may cause the Business Reviews application to launch to the application state for the restaurant, which may include reviews and other content for the restaurant.

The displayed links include a variety of information. Each of the links includes a business name, address, and graphic/image. Each of the links also includes a rating. The Business Reviews application provides ratings as values out of five stars. The Restaurant Reviews application provides ratings as a total out of 100. As such, the different rating systems of the applications are maintained in the search results by the index generation system 100 and the search system 102.

The index generation system 100 and the search system 102 may also provide popularity indicators in the search result GUI that are based on data from the event system 108. The first two links 806, 808 include the popularity indicators "Very Popular" and "Popular". The index generation system 100 (e.g., modules 202, 204, or 206) may generate the popularity indicators based on the event data associated with the entities. For example, the popularity indicators may be generated in the display data for the links based on popularity scores associated with the restaurant entities. The "Very Popular" indicator may be associated with a popularity score that is greater than a high threshold value (e.g., >0.90). The "Popular" indicator may be associated with a popularity score that is less than the high threshold value, but greater than a lower threshold value (e.g., 0.75). The third link 810 does not include a popularity indicator. The lack of a popularity indicator may indicate that the event system 108 did not provide a popularity score for the entity or that the popularity score of the entity was less than a threshold value (e.g., less than the lower threshold value).

In some implementations, the search system 102 may have ranked the search results at least partially based on the popularity scores associated with the search results. For example, the search results in FIG. 8 are ranked according to popularity score, along with other factors, such as textual relevance. As such, the search results in FIG. 8 indicate how the availability of values from different sources (e.g., popularity scores) may be used by the search system 102 for scoring/ranking search results as well as generating dynamic display data (e.g., popularity indicators) that may be used to enhance rendering of search results for different applications.

FIGS. 9A-9B illustrate and describe an event system 108 and associated user data objects 900. An event system 108 may receive event data generated by user devices 104 (e.g., mobile computing devices). User devices 104 may generate event data while a user is browsing websites and/or using an application (e.g., a native application) installed on the user device. For example, the owner/operator of the event system 108 may provide a web module 902 for partner websites 904. The web module 902 may generate event data that is reported to the event system 108. With respect to applications, the owner/operator of the event system 108 may provide an application module 906 ("app module") for partner applications 908. The app module 906 may generate event data that is reported to the event system 108. The web and app modules 902, 906 may include software libraries and functions/methods that may be included in websites and applications. The functions/methods may be invoked to provide the website/application with various functionalities described herein with respect to the event system 108.

Event data may be generated by the web/app modules 902, 906 when a user opens/closes an application, views a webpage, and/or selects links (e.g., hyperlinks) in an application or on a webpage, for example. The event system 108 can track events that occur on user devices over time and attribute the occurrence of some events to other events (e.g., prior events). For example, the event system 108 may attribute the installation of an application to a prior user selection of a link, such as a hyperlink on a webpage or a banner advertisement. As another example, the event system 108 may attribute the purchase of an item on a website and/or application to a previously selected link. The attribution functionality provided by the event system 108 may be used to provide various functionality to user devices, such as routing a user device into an application state in response to user selection of a web link.

The event data received by the event system 108 may include device identifiers ("device IDs") that identify the user device that generated the event data. The event system 108 can use the various device IDs for tracking events (e.g., application installations, application opens, and link selections) and attributing events to prior events. Some device IDs may be associated with a web browser on a user device (e.g., set by a web browser). Device IDs associated with the web browser may be referred to herein as "web IDs." Example web IDs may include browser cookie IDs, which may be referred to as web cookies, internet cookies, or Hypertext Transfer Protocol (HTTP) cookies. Some device IDs may be associated with applications installed on the user device other than the web browser. In some cases, the device IDs may be operating system generated IDs that installed applications may access. Additional example device IDs may include advertising IDs, which may vary depending on the operating system (OS) on the user device.

The event system 108 can store event data for individual users (e.g., in user data objects 900). Each user data object 900 may include data (e.g., a list of events) indicating how a person uses one or more user devices over time. For example, a single user data object may include data indicating how a person uses a web browser and multiple applications on a single user device (e.g., a smartphone). In a more specific example, a single user data object may include data indicating how a person interacts with a partner's website and application. The event system 108 may store one or more user data objects 900 for each user device from which event data is received. The event system 108 may update existing user data objects in response to receiving event data associated with device IDs that are the same as device IDs included in existing user data objects. The event system 108 may generate a new user data object for each event associated with a new device ID. Since a single user device may generate multiple device IDs (e.g., web IDs and/or advertising IDs), the event system 108 may store multiple user data objects for a single device. The event system 108 can include matching functionality that identifies different user data objects that belong to the same user device. For example, the event system 108 may match two user data objects based on data including, but not limited to, the Internet Protocol (IP) addresses of the user devices, OS names, OS versions, device types, screen resolutions, and user identification data (e.g., a username). In one example, the event system 108 may combine matching user data objects (e.g., combine event data).

In some cases, the event system 108 can leverage user data objects 900 to provide responses to a user device based on past events generated by the user device, as illustrated by the following example. If a user selects a link for accessing content in an application that the user device does not have installed, the event system can log the selection of the link and can redirect the user to download/install the application. Upon opening the newly installed application, the application can transmit an event to the event system 108. The event system 108 may match the two user data objects and, based on the match, the event system 108 can direct the opened application to the content linked to by the previously selected link. In this example, the opening of the application and installation of the application may be attributed to the selection of the link.

In some implementations, the event system 108 can generate and store data for use in user-selectable links, such as advertisement links and/or links to shared content. For example, the event system 108 may generate and store a system link data object that includes a system URI and data. The system URI may indicate the network location of a system link data object (e.g., using a domain/path). The system URI may be included in a user-selectable link (referred to herein as a "system link 910") in an application or on a website. Example user-selectable links may include hyperlinks, GUI buttons, graphical banners, or graphical overlays. In response to selection of a system link 910, a user device may access the event system 108, which may provide a response to the user device. For example, in response to receiving a system URI from a user device, the event system 108 can retrieve data corresponding to the received system URI and perform a variety of functions based on the retrieved data. In one example, the event system 108 can redirect the user device based on the data (e.g., to download the application or to a default location). In another example, the event system 108 may pass the data (e.g., a discount code, user referral name, etc.) to the user device so that the user device can act based on the data. The event system 108 may log the selection of the system links 910 and attempt to match the system link selections to other events included in the same user data objects or different user data objects.

A partner can integrate with the event system 108 in a variety of ways. For example, the partner can retrieve application and web module components that the partner can modify and include into their application(s) and website. The application module components may include software libraries and functions/methods that may be included in the partner's application. The functions/methods may be invoked by the application to request system links, handle the selection of system links, transmit event data to the event system 108 (e.g., application open events), and handle data received from the event system 108. The web module components may include software libraries and functions/methods that may be included in the partner's website. The functions/methods (e.g., JavaScript) may be invoked to provide the website with various functionalities described herein with respect to the event system 108. For example, the functions/methods may be invoked to request system links, handle the selection of system links, transmit event data to the event system 108 (e.g., webpage view events), and handle data received from the event system 108. The partners may also generate system links 910 for inclusion in their applications/websites and or other applications/websites.

The event system 108 can handle events and respond to the user devices. In one example, if the event system 108 has attributed an incoming event to a prior event, the event system 108 may handle the incoming event in a manner that depends on the prior event. In an example where the installation of an application is attributed to the prior user selection of a system link, the event system 108 may route the newly installed application according to the system URI of the prior selected system link. In some cases, if the event system 108 receives a system URI (e.g., event data indicating a click on a system link), the event system 108 can retrieve data associated with the system link. The event system 108 can then respond to the user device according to the data. For example, the event system 108 may route the user device (e.g., redirect the web browser) according to the data. The response provided by the event system 108 to the user device can vary, depending on a variety of factors. In some cases, the event system 108 may route the user device (e.g., web browser and/or application) in response to a received event. In some cases, the event system 108 may transfer data to the user device in response to a received event.

In some implementations, the event data may include user identification data that identifies a user. User identification data may include a username/login. In some cases, the username may include an email address. The user identification data may identify a user with respect to a website/application. In one specific example, the username and app ID pair may identify a user uniquely with respect to the application/website associated with the app name/ID.

In some implementations, event data may include source data that indicates the source of an event. As described herein, event data may be generated in response to a user action, such as a user interacting with a link, webpage, or application state. For example, event data may be generated when a user views a webpage or application state, or when a user interacts with system links or other GUI elements included on a webpage or application state. The source data (e.g., on a per-event basis) may describe the network location and/or circumstances associated with the generation of the event data (e.g., the location where a link was viewed or selected).

The event data generated by the user device may be characterized as application event data ("app event data") or web event data. The characterization of events may depend on whether the event data is generated via user interactions with the web browser or other applications. Web events may generally originate from the web browser and may be associated with a web ID (e.g., a cookie ID). For example, web events may refer to events generated by the web module of the partner's website. App events may generally originate from an application other than the web browser and may be associated with a device ID (e.g., a device ID other than a web ID, such as an advertising ID). For example, app events may refer to events generated by the app module of the partner's application. Another type of event described herein is a link selection event that generates link data. The link selection event may be generated by the selection of a system link on a partner's website/application or in another website/application. A link selection event may be characterized as either an app event or web event, depending on how the user device handles the link selection. The event data received by the event system 108 may be received as HTTP requests or HTTP secure (HTTPS) requests in some cases. The event system 108 may handle link events (e.g., by sending a response) based on a variety of factors described herein, such as how the user device is configured to handle selection of a system link.

The user device may transmit app event data (e.g., according to the app module) in response to a variety of different user actions. For example, the user device may transmit app event data in response to: 1) an application being opened (referred to as an "app open event"), 2) the user closing the application (referred to as an "app close event"), 3) the user adding an item to a shopping cart or the user purchasing an item (referred to generally as "application commerce events"), 4) the user opening the application after installation (referred to as an "app installation event"), 5) the user opening the application after reinstallation (referred to as an "app reinstallation event"), 6) the user requesting that a system URI be created by the event system 108 and transmitted back to the user device (e.g., in order to share content), 7) a user accessing a state of the application (e.g., an app page), 8) a user performing an action that the app module 906 has been configured by the operator of the event system 108 to report, and 9) the user performing any other action that the app module 906 has been configured by the partner to report to the event system 108 (i.e., a custom event defined by the partner). For example, a partner may define custom events to indicate that a specific application state (e.g., application page) or specific piece of content is viewed or shared.

The app event data received by the event system 108 may include, but is not limited to: 1) a device ID (e.g., an advertising ID, hardware ID, etc.), 2) an application name/ID that indicates the application with which the app event data is associated, 3) user identification data that identifies a user of the app (e.g., a username), 4) source data indicating the source of the event data, and 5) device metadata (e.g., user agent data), such as an IP address, OS identification data (e.g., OS name, OS version), device type, and screen resolution. The app event data may also include an event identifier that indicates the type of event. For example, the event identifier may indicate whether the app event is an app open event, an app close event, an app installation event, an app reinstallation event, a commerce event, or a custom event that may be defined by the developer in the app module 906. In the case the app event is an app open event that resulted from user-selection of a link (e.g., a system link), additional app event data may be transmitted by the user device, such as the URI (e.g., a system URI) that caused the user device to open the application. In some cases, the app event data may also include a web ID (e.g., appended to the system URI) associated with the URI.

The event system 108 may perform a variety of different operations in response to receiving event data. For example, the event system may: 1) timestamp the received app event data (or use a received timestamp), 2) determine the source of the app event, 3) log the event data, 4) determine if the app event can be attributed to any previous event, and/or 5) determine whether an app open event is an install event or a reinstall event. In the case the event system 108 receives a system URI, the event system 108 may acquire data associated with the system URI. In the case the event system 108 receives a link generation request, the event system 108 can generate a link data object and transmit the system URI back to the user device.

The user device may transmit web event data (e.g., according to the web module) in response to a variety of different user actions. For example, the user device may transmit web event data in response to a user accessing a webpage (referred to as a "webpage view event"). Accessing a webpage may be the start of a web session (e.g., the first webpage access on the site) or a subsequent page view. The user device may also transmit web event data in response to the user adding an item to a shopping cart or the user purchasing an item (referred to generally as "web commerce events"), the user requesting that a system URI be created by the event system 108 and transmitted back to the user device (e.g., in order to share content), a user performing an action that the web module 902 has been configured by the operator of the event system 108 to report, and the user performing any other action that the web module 902 has been configured by the partner to report to the event system 108 (i.e., a custom web event defined by the partner). For example, a partner may define custom events to indicate that a specific webpage or specific piece of content is viewed or shared.

The web event data received by the event system 108 may include, but is not limited to: 1) a web ID, 2) the website name/ID, which may correspond to the app name/ID or app ID in the event system 108, and 3) device/browser metadata (e.g., user agent data), such as IP address, OS identification data (e.g., OS name, OS version), device type, and screen resolution. The device/browser metadata may be extracted from the user agent sent by the web browser. The web event data may also include user identification data that identifies a user of the website (e.g., a username), source data indicating the source of the web event data, and an event identifier that indicates the type of event. For example, the event identifier may indicate whether the web event is a webpage view event, a commerce event, a link creation event, a sharing event, or a custom event defined by the developer in the web module 902.

The event system 108 may perform a variety of different operations in response to receiving web event data. For example, the event system 108 may: 1) timestamp the received web event data (or use a received timestamp), 2)

determine the source of the web event, 3) log the web event data, and/or 4) determine if the web event can be attributed to any previous event. In the case the event system 108 receives a link generation request, the event system 108 can generate a system link data object and transmit the system URI back to the user device. The event system 108 may also set a web ID on the user device in the case the web browser does not include a web ID.

User selection of the system link 910 may be handled by the user device in a variety of ways, depending on how the user device is configured. In some cases, selection of a system link 910 may cause an application to open, in which case the selection of the system link (e.g., the system URI) is passed to the event system 108 in the app open event. In other cases, the selection of a system link 910 is handled by the web browser, which accesses the event system 108 using the system URI associated with the system link 910. In implementations where the web browser accesses the event system 108 in response to user selection of a system link 910, the link event data may include a web ID and device/browser metadata. The device/browser metadata (e.g., user agent data) may include an IP address, OS identification data (e.g., OS name, OS version), device type, and screen resolution.

The event system 108 may perform a variety of different operations in response to receiving link event data, including, but not limited to: 1) timestamping the received link event data (or using a received timestamp), 2) determining the source of the link event data, 3) logging the link event data, 4) retrieving data for the received system URI, 5) routing the user device to a location (e.g., a digital distribution platform for downloading the application, a default site, or other site) based on the retrieved data, and 6) setting a web ID in the case the web browser does not include a web ID.

The partner, or a user device (e.g., app/web module), can request system URIs from the event system 108. In the request, the partner (or the user device) can specify operations and data to be associated with a system URI. The system URI may include a domain name (e.g., example.com or www.example.com) and a path (e.g., example.com/path_segment1/path_segment2/). The domain name and path can be used to access the data object associated with the system URI via the network. In some cases, the scheme for the system URI may be a web uniform resource locator (URL) using http, or another scheme, such as ftp.

User data objects 900 may also include data that may be derived from the list of events for the app/website. Additional data may include, but is not limited to, a) a timestamp indicating the most recent usage of the app/website, b) a timestamp indicating the last time the app/website was accessed on a mobile device, c) a timestamp indicating the last time the app/website was accessed on a desktop device, d) activity data that indicates how often and when the app/website was used over a period of time (e.g., which days the app/website was used over a predetermined number of previous days), e) activity data that indicates how often the app/website was used on a mobile device, f) activity data that indicates how often the app/website was used on a desktop device, and g) a timestamp indicating the first time the user used the app/website (e.g., an earliest event in the list of events).

The data providers 106-3 may provide event data ("external event data") to the event system 108. The data providers 106-3 may be parties other than the partners and the operators of the event system 108. In some implementations, the data providers 106-3 may be businesses that provide data management and analytics services (e.g., to the partners, the event system 108, and other parties). The data providers 106-3 may collect additional data (e.g., in addition to the event system 108) regarding how users are using the partners' applications and websites. In some cases, the partners may use the data providers to store event data and/or provide analytics.

The external event data may include data associated with events that occur with respect to the partners' websites and/or applications. Additionally, or alternatively, the external event data may be data associated with events that occur on websites and applications that are not operated by the partners. In some cases, the external event data may include event data that is otherwise not acquired by the event system 108 (e.g., via the app/web modules). For example, the data providers 106-3 may receive additional event data via modules incorporated into the partners' websites/applications by other parties (e.g., the data providers themselves). The event system 108 may process external event data received from the data providers 106-3 in a manner similar to event data received from the user devices.

The event system 108 can generate aggregate event data based on the app event data, web event data, and system link data. Aggregate app event data may include aggregate app usage data that indicates a number of users of the application over time. Example aggregate app usage data may include, but is not limited to, the number of daily active users (DAU) for the application and the number of monthly active users (MAU) for the application. The aggregate app usage data may also include the number of app events over time for a plurality of users. For example, aggregate app usage data may include the number of application opens over time, the number of different application states accessed over time, and the number of purchase events over time. In some implementations, the aggregate app event data may indicate a number of times systems links were generated for applications, used to access applications, and/or selected within an application state. The aggregate app usage data may also include the number of times applications and application states were accessed by one or more users.

In some implementations, the search module 222 may score/filter search results based on the user's personal application usage (e.g., one or more application usage values). For example, the search module 222 may score/filter based on the amount an application is used, such as the frequency of usage or total usage. In this example, search results associated with higher application and application state usage may be boosted. In some implementations, the search module 222 may score/filter search results based on the recency of application usage. For example, results for more recently used applications may be scored higher. In this example, results associated with applications that have not been used in a period of time may be filtered out.

Additional personalization can be based on personalized usage patterns, such as the day of the week applications are used and/or the time of day the applications are used. In this example, the search module 222 may boost results that are associated with applications the user uses at the current time of day or day of week. Additional personalization can be based on application installation status and usage by device type (e.g., laptop, smartphone, etc.). For example, the search module 222 may score/filter results based on user historical application usage by device.

The event system 108 may determine a popularity score for each search record entity. A popularity score may be a number (e.g., from 0.00-1.00) that indicates the popularity of the entity. For example, the popularity score may indicate the popularity of the entity relative to other entities. The popularity score can be used to rank the most useful entity results higher in the search results. The popularity score can be stored in the associated EP record and/or search record. In some implementations, the popularity scores can be normalized (e.g., within a vertical).

As described herein, the event system 108 can acquire data from multiple applications and websites, including varied metadata corresponding to a variety of user engagements (e.g., represented as events). The popularity score may map this data (app, engagement type) to an entity popularity score. This may provide for improved entity ranking in an entity search. For example, for the search query "restaurants in San Francisco," the user may want the most popular restaurants in the city.

The event system 108 may use the set of engagement data and determine a single popularity score ranging from 0 to 1 that represents the relative popularity for each entity (e.g., each entity ID). The event system 108 may determine a popularity score for an entity based on a number of engagements (e.g., events) with the entity relative to a number of engagements with other entities. For example, the event system 108 may determine the popularity score by dividing the number of engagements with an entity by a number of engagements with the most popular entity. Popularity score generation can include pre-defined mathematical functions over the raw engagement counts, normalized engagement counts, or any other mathematical function.

The search system 102 may score/filter the search results based on the popularity scores associated with the entities and/or usage values associated with the applications/entities. For example, the search module 222 may implement a scoring/filtering function that receives the entity popularity and/or usage values as input. In some implementations, the search module 222 may filter out (e.g., remove) search records associated with entities that have a popularity score that is less than a threshold value. The popularity scores used by the search system 102 can help assure that search results provide popular entities that are relevant to the user.

The data structures (e.g., records) and data stores described herein are only example data structures and data stores. As such, the index generation system 100 and the search system 102 may implement the techniques of the present disclosure using additional/alternative data structures and data stores.

Modules and data stores included in the systems 100, 102 represent features that may be included in the systems 100, 102 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems 100, 102 may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems 100, 102 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the systems 100, 102 may be configured to communicate with the network 112. The one or more computing devices of the systems 100, 102 may also be configured to communicate with one another (e.g., via a computer network). In some examples, the one or more computing devices of the systems 100, 102 may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems 100, 102 may be distributed across a number of geographic locations.

What is claimed is:

1. A method comprising:
   storing a plurality of vertical-specific (VS) templates, wherein each VS template is associated with one of N different verticals, wherein the vertical refers to a type of application content to be inserted into the VS template, and wherein each VS template includes a set of empty vertical-specific data fields;
   generating a plurality of vertical-specific (VS) records from a plurality of data sources, wherein generating each VS record includes extracting data from a selected data source, selecting one of the plurality of VS templates corresponding to the vertical associated with the selected data source, and completing at least a portion of the selected one of the VS templates with the extracted data, wherein each VS record is associated with one of N different verticals, and wherein each VS record includes:
      a vertical identifier (ID) that indicates the vertical associated with the VS record, wherein the vertical refers to a type of application content associated with included in the VS record; and
      a set of completed vertical-specific data fields for the vertical associated with the VS record;
   generating an entity partial (EP) record for each of the generated VS records, wherein generating each EP record includes using data from a corresponding generated VS record, and wherein each EP record includes a set of EP data fields populated using data from one or more completed vertical-specific data fields of the corresponding VS record, the set of EP data fields including:
      an entity ID that indicates an entity associated with the EP record;
      a source data field that identifies a data source for the VS record used to generate the EP record; and
      an EP searchable data field including data that is descriptive of the entity associated with the EP record;
   generating a search record for each entity ID by combining data from EP records associated with the same entity ID, wherein the data from the EP records is combined based on the source data included in the EP records, and wherein each search record includes a search record searchable data field that includes data from one or more of the EP searchable data fields of the EP records used to generate the search record;
   receiving a search query from a user device;
   identifying a set of search records based on matches between terms of the search query and terms in the search record searchable data of the set of search records; and
   sending search results to the user device that are based on the identified set of search records.

2. The method of claim 1, wherein the set of vertical-specific data fields are the same for each VS record having the same vertical ID.

3. The method of claim 2, wherein VS records that include different vertical IDs include different sets of vertical-specific data fields.

4. The method of claim 1, wherein, for a subset of the VS records, the set of vertical-specific data fields includes a majority of fields that are empty and a minority of fields that are completed with values.

5. The method of claim 1, wherein the set of EP data fields includes a date data field that indicates a date of generation for the VS record used to generate the EP record, and wherein the data from the EP records is combined based on the source data and the date data included in the EP records.

6. The method of claim 1, wherein the set of EP data fields includes a date data field that indicates a date of the content in the data source for the VS record used to generate the EP record, and wherein the data from the EP records is combined based on the source data and the date data included in the EP records.

7. The method of claim 1, wherein the set of EP data fields includes a popularity score that indicates a popularity of the entity associated with the EP record, wherein the search records in the identified set of search records include popularity scores, and wherein the method further comprises ranking the identified set of search results based on the popularity scores included in the search records.

8. The method of claim 1, further comprising generating the EP records from the VS records based on which vertical-specific data fields are completed in the VS records.

9. The method of claim 1, further comprising generating the EP records from the VS records based on the vertical IDs included in the VS records.

10. The method of claim 1, wherein each VS record includes an application ID that identifies an application associated with the VS record, and wherein the method further comprises generating the EP records from the VS records based on the application IDs included in the VS records.

11. A system comprising:
    one or more storage devices configured to store a plurality of vertical-specific (VS) records, entity partial (EP) records, and search records, and vertical-specific (VS) templates, wherein each VS template is associated with one of N different verticals, wherein the vertical refers to a type of application content to be inserted into the VS template, and wherein each VS template includes a set of empty vertical-specific data fields; and
    one or more processing units that execute computer-readable instructions that cause the one or more processing units to:
       generate the plurality of VS records from a plurality of data sources, wherein generating each VS record includes extracting data from a selected data source, selecting one of the plurality of VS templates corresponding to the vertical associated with the selected data source, and completing at least a portion of the selected one of the VS templates with the extracted data, wherein each VS record is associated with one of N different verticals, and wherein each VS record includes:
  a vertical identifier (ID) that indicates the vertical associated with the VS record, wherein the vertical refers to a type of application content associated with included in the VS record; and
  a set of completed vertical-specific data fields for the vertical associated with the VS record;
generate one EP record for each of the generated VS records, wherein generating each EP record includes using data from a corresponding generated VS record, and wherein each EP record includes a set of EP data fields populated using data from one or more completed vertical-specific data fields of the corresponding VS record, the set of EP data fields including:
  an entity ID that indicates an entity associated with the EP record;
  a source data field that identifies a data source for the VS record used to generate the EP record; and
  an EP searchable data field including data that is descriptive of the entity associated with the EP record;
generate one search record for each entity ID by combining data from EP records associated with the same entity ID, wherein the data from the EP records is combined based on the source data included in the EP records, and wherein each search record includes a search record searchable data field that includes data from one or more of the EP searchable data fields of the EP records used to generate the search record;
receive a search query from a user device;
identify a set of search records based on matches between terms of the search query and terms in the search record searchable data of the set of search records; and
send search results to the user device that are based on the identified set of search records.

12. The system of claim 11, wherein the set of vertical-specific data fields are the same for each VS record having the same vertical ID.

13. The system of claim 12, wherein VS records that include different vertical IDs include different sets of vertical-specific data fields.

14. The system of claim 11, wherein, for a subset of the VS records, the set of vertical-specific data fields includes a majority of fields that are empty and a minority of fields that are completed with values.

15. The system of claim 11, wherein the set of EP data fields includes a date data field that indicates a date of generation for the VS record used to generate the EP record, and wherein the data from the EP records is combined based on the source data and the date data included in the EP records.

16. The system of claim 11, wherein the set of EP data fields includes a date data field that indicates a date of the content in the data source for the VS record used to generate the EP record, and wherein the data from the EP records is combined based on the source data and the date data included in the EP records.

17. The system of claim 11, wherein the set of EP data fields includes a popularity score that indicates a popularity of the entity associated with the EP record, wherein the search records in the identified set of search records include popularity scores, and wherein the one or more processing units are configured to rank the identified set of search results based on the popularity scores included in the search records.

18. The system of claim 11, wherein the one or more processing units are configured to generate the EP records from the VS records based on which vertical-specific data fields are completed in the VS records.

19. The system of claim 11, wherein the one or more processing units are configured to generate the EP records from the VS records based on the vertical IDs included in the VS records.

20. The system of claim 11, wherein each VS record includes an application ID that identifies an application associated with the VS record, and wherein the one or more processing units are configured to generate the EP records from the VS records based on the application IDs included in the VS records.

* * * * *